US009804818B2

(12) United States Patent
Gehring et al.

(10) Patent No.: US 9,804,818 B2
(45) Date of Patent: Oct. 31, 2017

(54) MUSICAL ANALYSIS PLATFORM

(71) Applicant: Apple Inc., Cupertino, CA (US)

(72) Inventors: Steffen Gehring, Hamburg (DE);
Pierre Fournier, Hamburg (DE)

(73) Assignee: Apple Inc., Cupertino, CA (US)

( * ) Notice: Subject to any disclaimer, the term of this patent is extended or adjusted under 35 U.S.C. 154(b) by 67 days.

(21) Appl. No.: 14/871,897

(22) Filed: Sep. 30, 2015

(65) Prior Publication Data

US 2017/0090860 A1 Mar. 30, 2017

(51) Int. Cl.
*G06F 17/00* (2006.01)
*G06F 3/16* (2006.01)

(52) U.S. Cl.
CPC .................. *G06F 3/165* (2013.01)

(58) Field of Classification Search
CPC ...................................................... G06F 3/165
See application file for complete search history.

(56) References Cited

U.S. PATENT DOCUMENTS

| | | |
|---|---|---|
| 5,424,486 A | 6/1995 | Aoki |
| 5,877,445 A | 3/1999 | Hufford et al. |
| 6,225,546 B1 | 5/2001 | Kraft et al. |
| 7,732,697 B1 | 6/2010 | Wieder |
| 8,044,290 B2 | 10/2011 | Kwon et al. |
| 8,283,548 B2 | 10/2012 | Oertl et al. |
| 9,117,432 B2 | 8/2015 | Nakamura |
| 2002/0176343 A1 | 11/2002 | Yamada et al. |

(Continued)

FOREIGN PATENT DOCUMENTS

| | | |
|---|---|---|
| EP | 1923863 | 5/2008 |
| EP | 1994525 | 11/2008 |

(Continued)

OTHER PUBLICATIONS

U.S. Appl. No. 14/871,271, "Non-Final Office Action", dated Aug. 25, 2016, 6 pages.

(Continued)

*Primary Examiner* — Joseph Saunders, Jr.
(74) *Attorney, Agent, or Firm* — Kilpatrick Townsend & Stockton LLP

(57) ABSTRACT

A platform or system is disclosed for performing musical analysis to detect musical properties in received live or pre-recorded audio data. The analysis can include a synchronous analysis for generating estimated one or more transitory musical properties and an asynchronous analysis for generating one or more aggregate musical properties which can be applied to the transitory musical properties to generate confirmed musical properties, which can be stored as metadata associated with an audio file. In some cases, live audio data can be received, recorded, dynamically analyzed to provide realtime metadata (e.g., to a display), then the realtime metadata can be analyzed to provide confirmed, updated, or validated metadata. In some cases, initial analysis (e.g., dynamic analysis) can determine chord estimates, usable in further analysis (e.g., offline analysis) to estimate a musical key, which can then be applied to the chord estimates to determine the most likely chord estimates and determine chord progressions.

30 Claims, 9 Drawing Sheets

(56) References Cited

U.S. PATENT DOCUMENTS

| | | | |
|---|---|---|---|
| 2004/0025672 A1* | 2/2004 | Carpenter | G10G 7/02 84/622 |
| 2005/0096764 A1 | 5/2005 | Weiser | |
| 2007/0255739 A1 | 11/2007 | Miyajima et al. | |
| 2007/0289434 A1 | 12/2007 | Yamada et al. | |
| 2008/0077263 A1 | 3/2008 | Yamane et al. | |
| 2008/0209484 A1 | 8/2008 | Xu et al. | |
| 2011/0112672 A1 | 5/2011 | Brown et al. | |
| 2011/0208330 A1 | 8/2011 | Oomae et al. | |
| 2011/0235811 A1 | 9/2011 | Koga et al. | |
| 2012/0014673 A1 | 1/2012 | O'Dwyer | |
| 2012/0051550 A1 | 3/2012 | Koga et al. | |
| 2012/0312145 A1 | 12/2012 | Kellett et al. | |
| 2013/0275421 A1 | 10/2013 | Resch et al. | |
| 2014/0260909 A1 | 9/2014 | Matusiak et al. | |
| 2014/0330556 A1 | 11/2014 | Resch et al. | |
| 2014/0338515 A1 | 11/2014 | Sheffer et al. | |
| 2014/0352521 A1 | 12/2014 | Takahashi et al. | |
| 2016/0148604 A1 | 5/2016 | Minamitaka | |
| 2017/0092245 A1 | 3/2017 | Kozielski et al. | |
| 2017/0092248 A1 | 3/2017 | Gozzi | |
| 2017/0092320 A1 | 3/2017 | Gehring | |

FOREIGN PATENT DOCUMENTS

| | | |
|---|---|---|
| EP | 2043006 | 4/2009 |
| EP | 2495720 | 9/2012 |
| JP | 2011150060 | 8/2011 |
| WO | 2017058365 | 4/2017 |
| WO | 2017058387 | 4/2017 |

OTHER PUBLICATIONS

U.S. Appl. No. 14/871,902, "Non-Final Office Action", dated Aug. 26, 2016, 6 pages.

Panagiotakis et al., "A Speech/Music Discriminator Based on RMS and Zero-Crossings", IEEE Transactions on Multimedia, vol. 7, No. 1, Feb. 1, 2005, pp. 155-166.

PCT/US2016/046117, "International Search Report and Written Opinion", dated Nov. 28, 2016, 13 pages.

PCT/US2016/046118, "International Search Report and Written Opinion", dated Nov. 22, 2016, 10 pages.

U.S. Appl. No. 14/871,271, "Notice of Allowance", dated Jan. 30, 2017, 7 pages.

U.S. Appl. No. 14/871,902, "Notice of Allowance", dated May 11, 2017, 8 pages.

U.S. Appl. No. 14/871,978, "Non-Final Office Action", dated Jan. 27, 2017, 14 pages.

Lazier et al., "Mosievius: Feature Driven Interactive Audio Mosaicing", Proceedings of Cost G-6 Conference on Digital Audio Effects, Sep. 8, 2003, pp. dafx-1-dafx-6.

PCT/US2016/047866, "International Search Report and Written Opinion", dated Dec. 13, 2016, 14 pages.

* cited by examiner

MUSICAL ANALYSIS PLATFORM

CROSS REFERENCE TO RELATED APPLICATIONS

The following regular U.S. patent applications are being filed concurrently with this application, the entire disclosures of which are incorporated by reference into this application for all purposes:

application Ser. No. 14/871,978, filed Sep. 30, 2015, entitled "Automatic Music Recording and Authoring Tool";

application Ser. No. 14/871,982, filed Sep. 30, 2015, entitled "Automatic Music Recording and Authoring Tool";

application Ser. No. 14/871,271, filed Sep 30, 2015, entitled "Automatic Composer"; and application Ser. No. 14/871,902, filed Sep. 30, 2015, entitled "MUSIC ANALYSIS PLATFORM".

TECHNICAL FIELD

The present disclosure relates to audio processing generally and more specifically to analysis of audio signals for musical properties.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
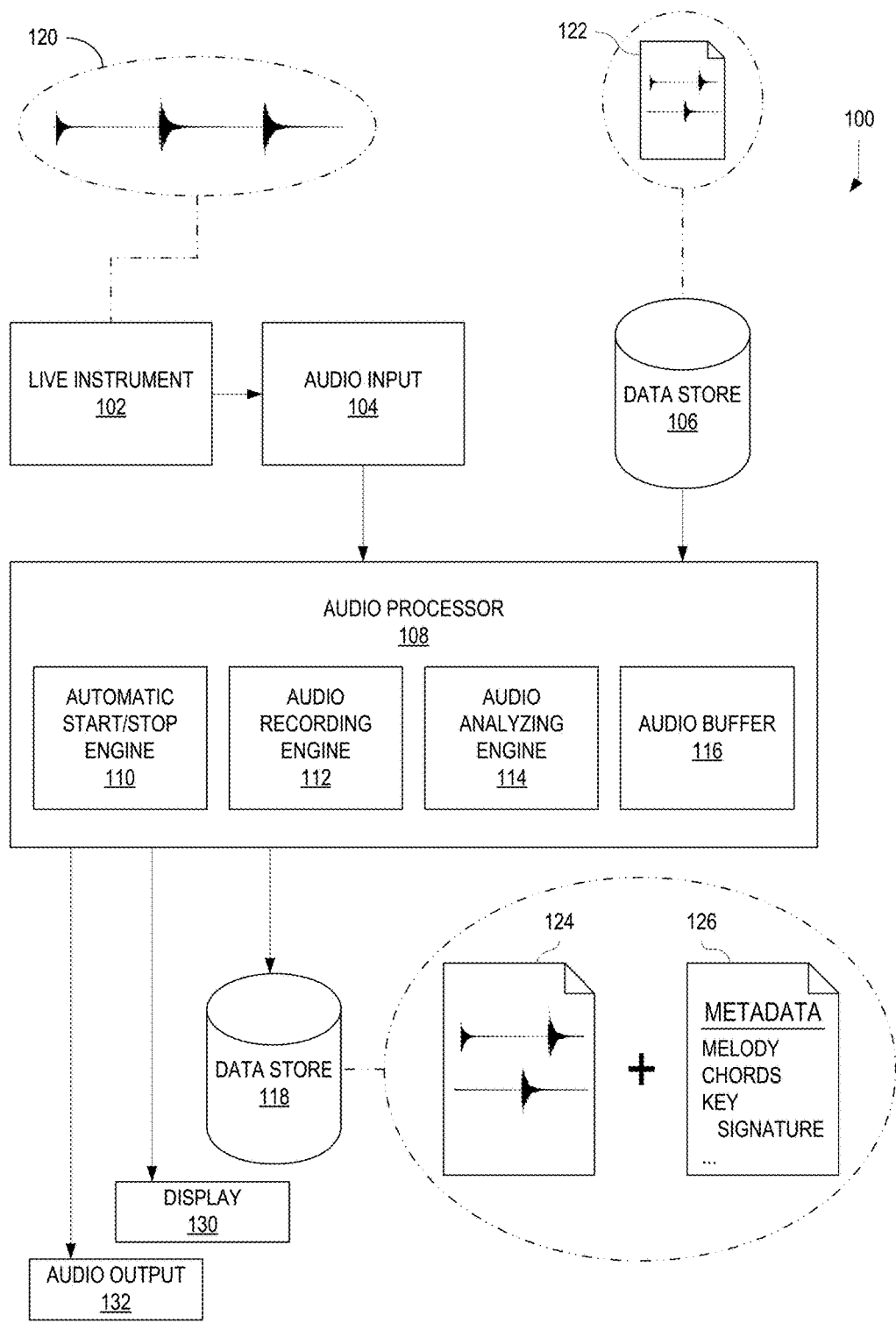
FIG. 1 is a schematic diagram depicting an audio processing system according to certain aspects of the present disclosure.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Certain aspects and features of the present disclosure relate to a platform or system for performing musical analysis to detect musical properties and store the musical properties as metadata associated with an audio file. The analysis can include a synchronous analysis for generating estimated one or more transitory musical properties and an asynchronous analysis for generating one or more aggregate musical properties which can be applied to the transitory musical properties to generate confirmed musical properties. In some cases, live audio data can be received, recorded, dynamically analyzed to provide realtime metadata (e.g., to a display), which can then be further analyzed to provide confirmed, updated, or validated metadata. In some cases, initial analysis (e.g., dynamic analysis) can determine chord estimates, which can then be used in further analysis (e.g., offline analysis) to estimate a musical key, which can then be applied to the chord estimates to determine the most likely chord estimates and determine chord progressions.

Initial analysis can include transforming audio data into frequency data (e.g., in the frequency domain) and identifying peak frequencies. In some cases, frequency data can be adjusted based on a tuning offset. A tuning offset can be calculated by selecting a target frequency and then calculating the difference between the target frequency and a reference frequency of a reference note corresponding to the target frequency. In some cases, multiple peak frequencies can be compared to one or more reference notes to determine the closest match, which peak frequency and reference note can be used to determine the tuning offset. In some cases, a single peak frequency is selected and compared with multiple reference notes to determine the close match, which reference note can be used with the peak frequency to determine the tuning offset.

The aspects and features disclosed herein can provide unique opportunities to musicians, including enhancements to a musician's ability to record, review, and manipulate their work.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale.

FIG. 1 is a schematic diagram depicting an audio processing system 100 according to certain aspects of the present disclosure. The audio processing system 100 can be embodied in one or more pieces of hardware, such as a single device (e.g., smartphone or computer), multiple devices directly coupled together (e.g., a rack of equipment), multiple devices remotely coupled together (e.g., multiple computers communicatively coupled together via a network), or any combination thereof. The audio processing system 100 can include an audio processor 108 capable of accessing audio data. Audio data can include any data received by the audio processor 108 that is representative of a sound. Audio data can be provided as an audio signal 120 or an audio file 122.

An audio signal 120 can be any analog or digital signal being performed or created in realtime. In some cases, audio signals 120 can be created by a live instrument 102 and provided to the audio processor 108 through an audio input 104. In some cases, audio signals 120 can be sound waves originating from a live instrument 102 (e.g., an acoustic guitar, a piano, a violin, a flute, or other traditional or non-traditional instrument capable of producing sound waves) that are picked up by an audio input 104 that is a microphone (e.g., a dynamic microphone, condenser microphone, ribbon microphone, fiber optic microphone, condenser microphone, hydrophone, or any other device capable of generating an electrical signal representative of a sound wave). In some cases, audio signals 120 can originate from voice (e.g., a singer or chorus), speakers (e.g., a pre-recorded sound or a live-played sound), nature-based sounds (e.g., wind noises or water noises), or other sources besides traditional instruments which can be received by an audio input 104 that is a microphone.

In some cases, audio signals 120 can be analog electrical signals originating from a live instrument 102 (e.g., electric guitar, electric piano, electric violin, Theremin, or other traditional or non-traditional instrument capable of producing an electrical signal corresponding to a sound wave) and received by an audio input 104 that is a line input.

In some cases, audio signals 120 can be digital signals originating from a live instrument 102 (e.g., a Musical Instrument Digital Interface (MIDI) controller, a computer-based digital instrument, or other traditional or non-traditional instrument capable of producing a digital signal representative of a sound wave) and received by an audio input 104 that is a digital signal processor. In some cases, audio signals 120 that are digital signals can be provided directly to the audio processor 108.

In some cases, other equipment, such as preamplifiers, digital signal processors, compressors, analog-to-digital converters, and the like, can be included as part of the audio input 104 or coupled between the audio input 104 and the audio processor 108.

In addition to or instead of receiving an audio signal 120, the audio processor 108 can receive audio data in the form or an audio file 122. Audio file 122 can be any audio data stored in a file that is representative of an audio signal 120, such as a waveform audio file, Moving Picture Experts Group (MPEG)-1 or MPEG 2 Audio Layer III (MP3) file, Apple Lossless Audio Codec (ALAC), or any other file containing audio data. In some cases, an audio file 122 can be included in a file containing more than just audio data, such as a video file or other file. The audio file 122 can be stored on a data store 106. Data store 106 can be any storage medium accessible to the audio processor 108, such as built-in memory (e.g., flash storage in a smartphone), external memory (e.g., an external hard drive of a computer), or remotely accessible memory (e.g., a hard drive of a computer accessible to the audio processor 108 via a network, such as the internet). In some cases, an audio file 122 can be generated in realtime (e.g., by a computer-based instrument) and need not be previously stored in a data store prior to being provided to the audio processor 108.

In some cases, the audio file 122 is a streaming file that is provided to the audio processor 108 through a communication link, such as a wireless or wired network connection. The streaming file can originate from a remote source, such as a recording device placed a distance from the audio processor 108 or a server accessible through a network (e.g., the Internet). In an example, a smartphone can act as a recording device and can be coupled to a computer via a communication link (e.g., WiFi or Bluetooth connection), where the computer acts as the audio processor 108. In that example, the smartphone can receive audio signals 120 at a microphone and store the audio signals as an audio file 122 which can be transmitted to the computer for further processing.

The audio processor 108 can process any incoming audio data. The audio processor 108 can include one or more of an automatic start/stop engine 110, an audio recording engine 112, an audio analyzing engine 114, and an audio buffer 116. The audio processor 108 can include more or fewer components. The audio processor 108 can be embodied in one or more data processors, such as central processing units (CPUs), application-specific integrated circuits (ASICs), microprocessors, or other devices or components capable of performing the functions associated with the audio processor 108.

The audio buffer 116 can include memory capable of storing incoming audio data. The audio buffer 116 can be stored on volatile or non-volatile memory. The audio buffer 116 can store a predetermined amount of audio data, such as a predetermined size (e.g., in bytes) or a predetermined length (e.g., in seconds) of audio data. In some cases, the audio buffer 116 can store the last n seconds of incoming audio data. The audio buffer 116 can overwrite itself in realtime so that the last n seconds or last n bytes of audio data are always available. In an example, the audio buffer 116 can store approximately five seconds worth of audio data, although shorter or longer audio buffers 116 can be used. In some cases, the size or length of the audio buffer 116 can be manually set, such as by a setting of a program or application utilizing the audio buffer 116. In some cases, the size or length of the audio buffer 116 can be automatically set, such as automatically increasing the size of the audio buffer 116 if a determination is made that current size of the audio buffer 116 is insufficient for its current purposes, or automatically decreasing the size of the audio buffer 116 if a determination is made that the current size of the audio buffer 116 exceeds is current purposes. In some cases, the size of the audio buffer 116 can be automatically scaled based on certain settings or parameters, such as a recording mode (e.g., more or less sensitive), input choice (e.g., line input versus microphone input), environmental parameters (e.g., noisy environment versus a quiet environment or steady noise environment versus an environment with occasional disruptive noises).

The automatic start/stop engine 110 can include one or more of an automatic start detector and an automatic stop detector. The automatic start/stop engine 110 can process incoming audio data (e.g., from an audio input 104, from a data store 106, or from the audio buffer 116). In some cases, the automatic start/stop engine 110 can dynamically analyze the contents of the audio buffer 116 to determine if a start event has occurred. In some cases, the automatic start/stop engine 110 can dynamically analyze and compare the first half of the audio buffer 116 with the second half of the audio buffer 116 to determine if a start event has occurred in the middle of the audio buffer 116.

The automatic start/stop engine 110 can look for characteristics (e.g., mathematical, calculated, musical, or other characteristics) of the audio data that are indicative of a start event. The start event can correspond to a time at which a desired action is to take place. For example, upon detecting a start event, the automatic start/stop engine 110 can initiate recording of the incoming audio data, such as by copying some or all of the audio buffer 116 (e.g., that portion of the audio buffer 116 that occurs at or after the start event) into a data file 124 of a data store 118 and begin appending the data file 124 with realtime audio data using the audio recording engine 112. Upon detecting a start event, the automatic start/stop engine 110 can also initiate analysis of the incoming audio data using the audio analyzing engine. The automatic start/stop engine 110 can trigger other tasks upon detection of a start event.

In some cases, the automatic start/stop engine 110 can look for a predetermined start event, such as the presence of musical content in the audio data. In some cases, the automatic start/stop engine 110 can look for other start events, such as detection of a count-off (e.g., speech recognition of "one, two, three, four") or detection of a particular characteristics such as a note, chord, or sequence of notes or chords (e.g., if a user wishes to record a second take of an existing recording, the automatic start/stop engine 110 can detect when the incoming audio data has characteristics similar to the beginning characteristics of the existing recording). In some cases, the automatic start/stop engine 110 can be used to trigger an action upon detection of musical content, versus noise or non-musical speech.

The automatic start/stop engine 110 can also analyze incoming audio data to determine a stop event (e.g., similarly to how a start event is determined). The stop event can be similar to and opposite from the start event, or can be otherwise defined. Upon detection of the stop event, the automatic start/stop engine 110 can trigger an action to stop (e.g., recording of incoming audio data) or trigger another action to be performed (e.g., transmitting the audio file 124 or beginning of post-processing the audio file 124). In an example use case, an automatic start/stop engine 110 can be used to automatically remove non-musical content from a radio station being recorded; the automatic start/stop engine 110 can automatically start recording (e.g., to create a new audio file 124 or append an existing audio file 124) upon detection of musical content and can automatically stop or pause recording upon detection of non-musical content.

The audio recording engine 112 can store incoming audio data as an audio file 124 stored on a data store 118. The data store 118 can be the same data store as data store 106, or can be a different data store 118. Data store 118 can be any suitable storage medium accessible to the audio processor 108, such as internal memory, external memory, or remote memory. In some cases, audio recording engine 112 can access audio buffer 116 to prepend any incoming audio data with some or all of the audio data stored in the audio buffer 116. In some cases, the audio recording engine 112 can append an existing audio file 124, such as if an audio file 124 was created using some or all of the audio data stored in the audio buffer 116.

The audio analyzing engine 114 can process incoming audio data (e.g., from live audio signals 120 or existing audio files 122) to generate metadata 126 related to the audio data. The metadata 126 can correspond to musical properties of the audio data, such a melody transcription, a chord transcription, one or more key signatures, or other such musical properties of the audio data. The metadata 126 can be stored as an independent file on the data store 118 and be related to the audio file 124. In some cases, the metadata 126 and the audio file 124 can be stored as parts in the same data file. In some cases, metadata 126 can be encoded directly into the audio file 124 (e.g., as signals that are demodulatable from the audio signal in the audio file 124).

The audio analyzing engine 114 can perform one or more of realtime (e.g., approximately realtime or dynamic) and non-realtime (e.g., post-processing of an entire audio file 124) analysis of audio data. In some cases, the audio analyzing engine 114 can perform an initial realtime analysis of incoming audio data (e.g., as being played from a live instrument 102) to determine some musical properties or estimates of musical properties, and then perform an additional non-realtime analysis of the audio file 124 to determine some musical properties or validate estimated musical properties.

In some cases, an audio analyzing engine of another device (e.g., a remove server) can perform additional processing to determine or validate one or more musical properties of the audio data (e.g., of audio file 124). In some cases, the audio processor 108 can transmit the audio file 124, the metadata 126, or both to the other device for further processing. Upon processing the received data, the other device can transmit new or updated data to the audio processor 108 (e.g., a new audio file 124, new metadata 126, or both).

In some cases, the audio processor 108 can be coupled to an output device, such as a display 130 or an audio output 132, although other output devices can be used. The audio processor 108 can produce outputs through the output device (s) related to any processes occurring in the audio processor 108, such as an audio analyzing process. In an example, the audio analyzing engine 114 can output musical properties to a display 130 (e.g., computer monitor or smartphone screen) in realtime while the audio data is being received by the audio processor 108. In another example, the audio analyzing engine 114 can use the detected musical properties to generate an accompaniment (e.g., a bass line generated based on detected chord progressions) which can be played through an audio output 132 (e.g., a speaker or line out).

As described herein, the audio processor 108 can output data (e.g., audio files 124 and metadata 126) to a data store 118. In some cases, outputting data can involve transmitting (e.g., streaming over a network connection) the data to a another device. For example, an audio processor 108 of a smartphone can receive an audio signal 120 from a live instrument 102, record incoming audio data as an audio file 124, analyze the audio data using the audio analyzing engine 114 to generate metadata 126, and transmit the audio file 124 and metadata 126 (e.g., through realtime streaming) to a computer located remote from the smartphone.

Figure 2:
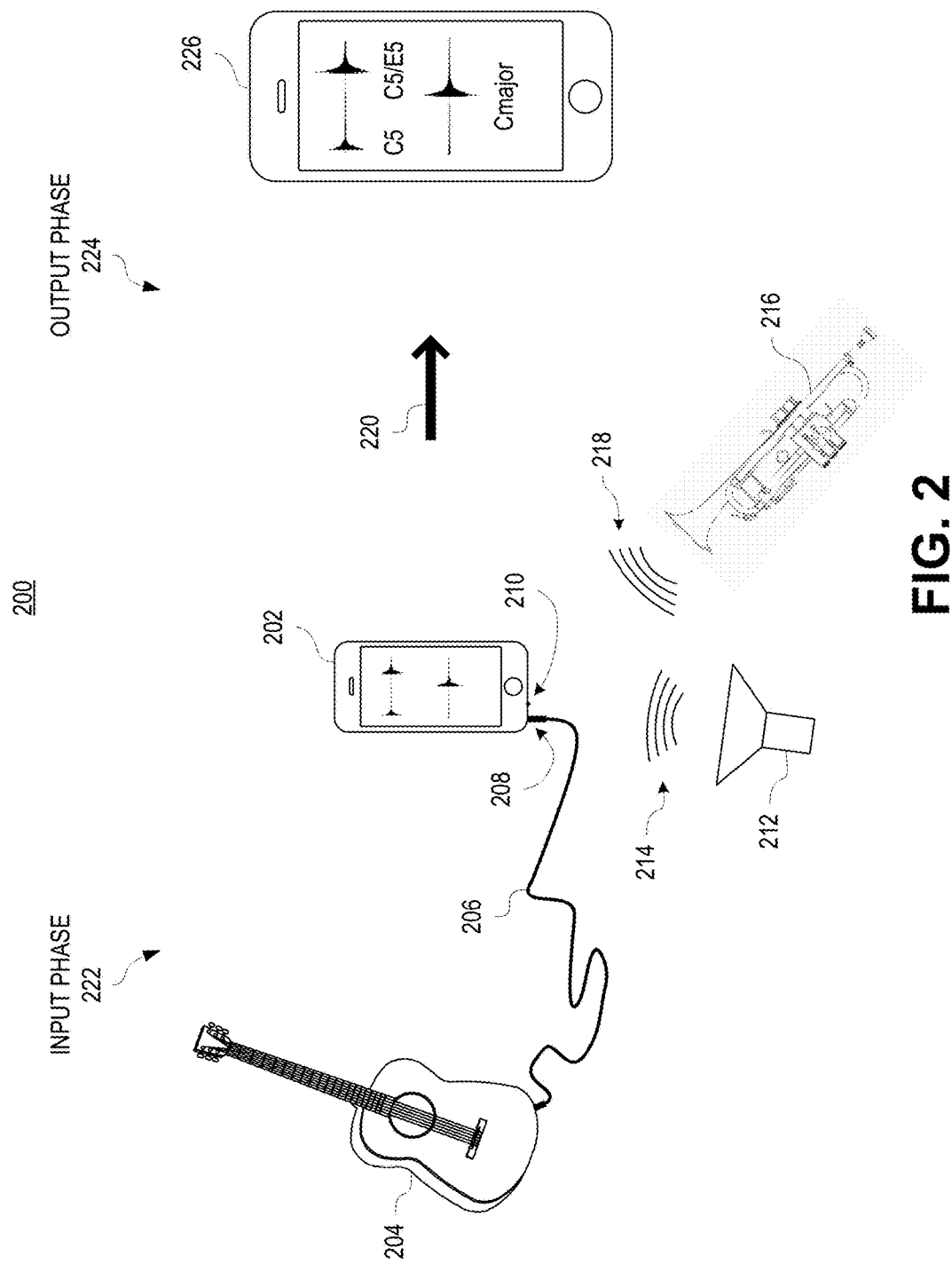
FIG. 2 is a schematic diagram depicting a recording environment according to certain aspects of the present disclosure.

FIG. 2 is a schematic diagram depicting a recording environment 200 according to certain aspects of the present disclosure. An input phase 222 and an output phase 224 are shown. During the input phase 222, the an audio processing device 202 can receive audio data from one or more sources. During the output phase 224, the audio processing device 226, which can be audio processing device 202 at a later point in time or another audio processing device, can process or display metadata 228 related to the audio data received during the input phase 222. An audio processing device 202, 226 can be any suitable device for receiving and processing audio data, such as a smartphone having a line input 208 (e.g., ⅛" headset jack) and a microphone 210. An audio processing device 202, 226 can be the audio processing system 100 of FIG. 1. The elements of FIG. 2 are not necessarily shown to scale.

The audio processing device 202 can receive audio data through a cable 206 coupled to the line input 208. The line input 208 can receive line level, microphone level, or other level input. Any suitable instrument or audio device can be coupled to the cable 206, such as an guitar 204 having an electric pickup. Examples of other suitable audio devices include electric pianos, microphone preamplifiers, a media player (e.g., MP3 player or compact disc player), a media receiver (e.g., radio receiver or internet streaming audio receiver), or other device capable of generating an audio signal. In some cases, the line input 208 can be coupled to multiple instruments or audio devices through the use of splitters, mixers, or other such audio equipment.

The audio processing device 202 can receive audio data through a microphone 210. The audio data can be sound waves 218 from an instrument 216 or sound waves 214 from another audio source. An instrument 216 can be any traditional or non-traditional instrument capable of generating acoustic sound waves detectable by microphone 210. Examples of other audio sources include a speaker 212 (e.g., home stereo speakers or loudspeakers at a public venue), nature-based sounds (e.g., wind noises or water noises), or any other source of sound waves 214.

The audio processing device 202 can receive audio data from one or more audio sources at a time. For example, the audio processing device 202 can receive audio data from multiple instruments 216 through the microphone 210, multiple instruments 214 through the line input 208, or multiple instruments 204, 216 through the line input 208 and microphone 210, respectively.

The audio processing device 202 can perform operations on the incoming audio data, such as those described herein and with reference to audio processor 108 of FIG. 1.

Figure 3:
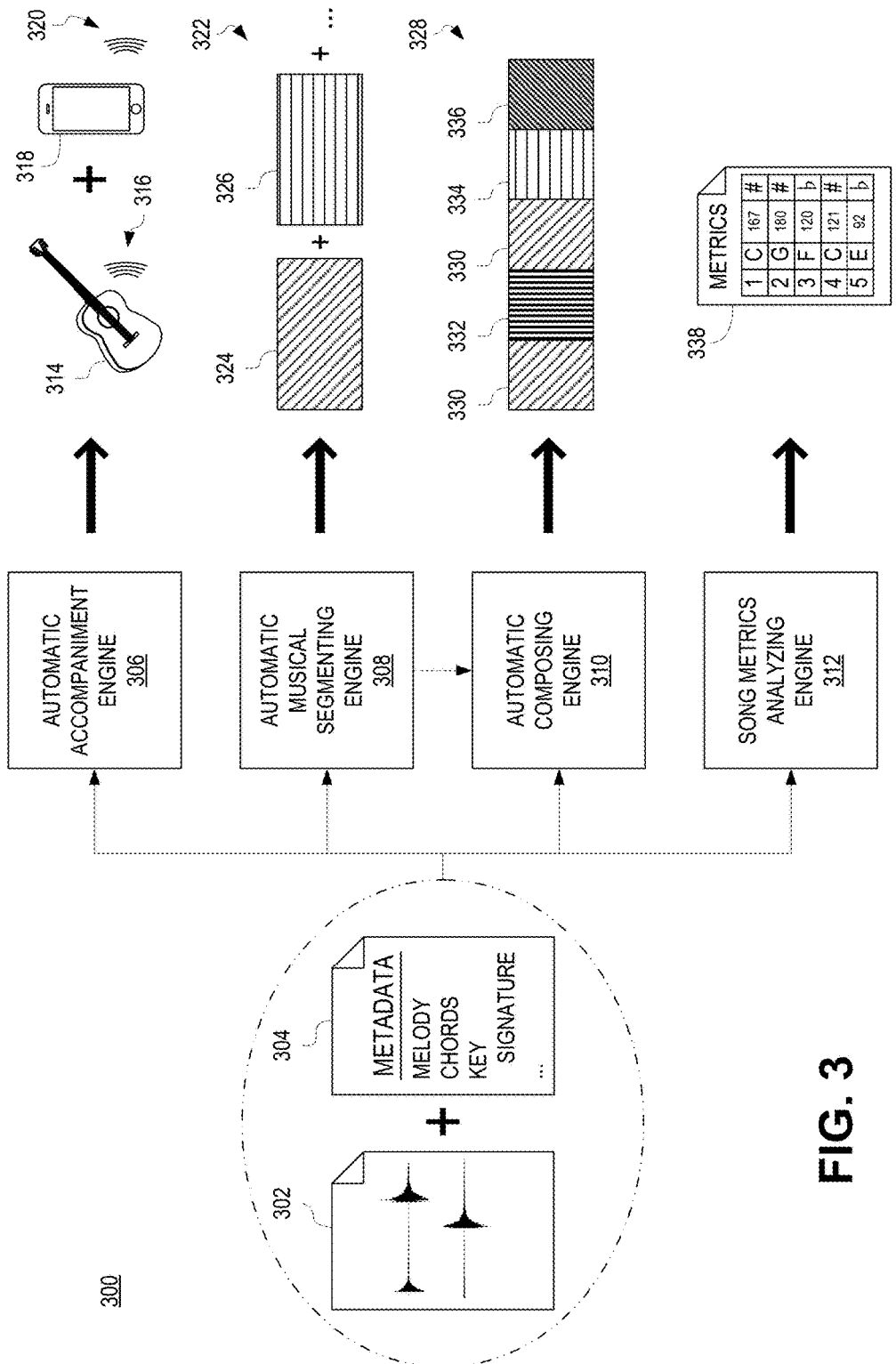
FIG. 3 is a schematic representation of a metadata usage environment according to certain aspects of the present disclosure.

FIG. 3 is a schematic representation of a metadata usage environment 300 according to certain aspects of the present disclosure. The metadata usage environment 300 can be any environment for making use of metadata 304 associated with audio data 124. The metadata 304 and audio data 124 can be stored (e.g., in a file on a data store, such as data store 118 of FIG. 1) or can be provided in realtime (e.g., approximately realtime) from an audio analyzing engine (e.g., audio analyzing engine 114 of FIG. 1).

The metadata usage environment 300 can operate on a suitable device, such as an audio processor (e.g., audio processor 108 of FIG. 1), an audio processing device (e.g., audio processing device 202, 226 of FIG. 2), or any other device suitable for making use of the metadata 304, such as a computer or smartphone. Several examples for using the metadata 304 are described with reference to the metadata usage environment 300, however the metadata 304 can be used in additional ways as well.

The metadata usage environment 300 can include an automatic accompaniment engine 306. The automatic accompaniment engine can use received metadata 304, and optionally received audio data 302, to generate an accompaniment. The accompaniment can be a collection of musical notes, chords, drum beats, or other musical sounds determined to musically fit with the audio data 302. The automatic accompaniment engine 306 can use musical properties identified in the metadata 304 associated with the audio data 302 to determine an accompaniment that satisfies a harmonic or musical fit with the audio data 302.

For example, audio data 302 may include a melody 316 played by a guitar 314. The metadata 304 may include a melody transcription for the melody 316 played by the guitar 314, as well as an identified key signature for the audio data 302. The automatic accompaniment engine 306 can use the key signature and melody transcription from the metadata 304 to identify other notes to play that would fill possible chords at various points in the piece (e.g., at the downbeat of every two measures). A device 318 (e.g., a smartphone or computer) implementing the automatic accompaniment engine 306 can play an accompaniment 320 based on the notes identified to fill possible chords. In some cases, the accompaniment 320 can be saved as another audio file or added to the audio data 302. In other cases, the accompaniment 320 can be performed by the device 318 (e.g., through a speaker, a line output, or a MIDI output to a MIDI instrument) as the audio data 302 is being played. In some cases, where the audio data 302 and metadata 304 are being provided in realtime, the device 318 may generate an accompaniment 320 to play along with a live performer.

The automatic accompaniment engine 306 can use any metadata 304 to generate the accompaniment. In some cases, certain metadata 304 can have a stronger weighting than other metadata (e.g., an identified key can have a stronger weight towards identifying what notes to play in an accompaniment than a melody transcription). The automatic accompaniment engine 306 can assign a confidence score for each attribute of the accompaniment (e.g., when to play a sound, for what duration to play the sound, what notes or chords to include in the sound, and the like) based on how well that attribute fits with the metadata 304.

In an example, a device 318 can be processing audio data 302 and metadata 304 associated with a melody 316 played by a guitar 314. For a section of the piece having metadata 304 that includes a key of G major and an identified chord progression of G, Bm, C, Em over the course of the section, the automatic accompaniment engine 306 may generate the notes G, B, C, and E (e.g., the roots of the chords) to be played over the course of the section. In another example, if the metadata 304 includes a key of G major, an Em chord, and the notes E and B for a particular measure of a piece, the automatic accompaniment engine 306 may generate the note G to be played (e.g., to fill out the chord).

The metadata usage environment 300 can include an automatic musical segmenting engine 308. The automatic musical segmenting engine 308 can use metadata 304 to split audio data 302 into a collection 322 of musical segments 324, 326. Any number of musical segments can be included in a collection 322. The automatic musical segmenting engine 308 can segment the audio data 302 based on musical attributes, such as chords, tempos, key signatures, measures, meters, musical figures, musical motifs, musical phrases, musical periods, musical sections, and other such attributes that are discernable from the audio data 302, metadata 304, or both.

In an example, audio data 302 for a song may have associated metadata 304 that includes rhythmic data and melody transcriptions. The automatic musical segmenting engine 308 can identify any combination of rhythmic patterns and melody patterns and segment the audio data 302 where the patterns repeat to create audio segments 324, 326. In another example, the automatic musical segmenting engine 308 can simply use rhythmic data (e.g., from metadata 304) to determine the downbeat of measures and segment the audio data 302 according to a manually set number of measures.

The metadata usage environment 300 can include an automatic composing engine 310. The automatic composing engine 310 can create a song 328 by piecing together any number of individual audio segments 330, 332, 334, 336. The song 328 can include only unique audio segments 330, 332, 334, 336 (e.g., no audio segment repeats), or can include one or more repeating audio segments (e.g., audio segment 330 in the example shown in FIG. 3). Each audio segment 330, 332, 334, 336 can be a segment 324, 326 (e.g., from the automatic musical segmenting engine 308). In some cases, each audio segment 330, 332, 334, 336 is a distinct audio file that has not been processed by an automatic musical segmenting engine 308.

The automatic composing engine 310 can use metadata 304 associated with the segments 330, 332, 334, 336 to determine a desirable order in which to arrange the audio segments 330, 332, 334, 336. The automatic composing engine 310 can determine a correlation score between the beginning and ending of each audio segment 330, 332, 334, 336 and arrange the audio segments 330, 332, 334, 336 based on the correlation scores. The correlation scores can take into account musical properties, such as key, melodic transcription, chord transcription, rhythmic data, tempo, and other such properties. Other evaluation methods can be used to determine a musical affinity between adjacent segments.

In some cases, the automatic composing engine 310 can specifically select an order of audio segments 330, 332, 334, 336 that is designed to produce an interesting song 328 (e.g., having varied musical properties between adjacent segments). For example, an automatic composing engine 310 may create a song 328 that includes a segment 330 identified as having a first chord progression, followed by a segment 332 identified as having a second chord progression in the same key as segment 330, followed by segment 330 again, followed by a segment 334 identified as having only melody transcription and no chord transcriptions, followed by a segment 336 identified as having a resolution (e.g., a held consonance note after a dissonant chord).

In some cases, one or more segments can be identified as an intro or outro segment, in which case the automatic composing engine 310 can use those segments exclusively at the beginning or end of the song 328, respectively. Intro and outro segments can be identified manually or automatically. Automatically identified intro and outro segments can be identified based on presence in an original piece (e.g., the first and last segments corresponding to the beginning and end of an audio file processed by an automatic musical segmenting engine 308 may be automatically labeled as intro and outro, respectively). Automatically identified intro and outro segments can also be identified based on musical properties of the segment itself.

In some cases, the automatic composing engine 310 can select a subset of audio segments from a larger set of audio segments for use in a song 328. For example, an automatic composing engine 310 may have access to a set of 80 audio segments (e.g., from multiple collections 322 of audio segments created using an automatic musical segmenting engine 308 on a plurality of audio files). The automatic composing engine 310 may select which out of the set of 80 audio segments to use in the final song 328. This selection process can be based on any combination of manual settings (e.g., a user desiring a two minute song) and musical properties (e.g., selecting all segments that match a particular key signature).

In some cases, the automatic composing engine 310 can allow a user to manipulate the order of the segments. The automatic composing engine 310 can store historical information related to the past manual placement of audio segments in relation to other audio segments and in relation to an overall song 328. The automatic composing engine 310 can learn from this historical information and use the historical information to improve its audio segment ordering and selection processes. In some cases, the historical information can be used to adjust the weighting of certain musical properties and can recognize patterns in audio segment placement.

The metadata usage environment 300 can include a song metrics analyzing engine 312. The song metrics analyzing engine 312 can analyze any attributes of the metadata 304 associated with audio data 302. The song metrics analyzing engine 312 can be used to determine patterns, relationships, averages, or other metrics associated with musical properties of the audio data 302. For example, the song metrics analyzing engine 312 can determine the most common chord used in a piece, the number of times each note was used in a piece, the average tempo or tempo changes throughout a piece, and other metrics. The song metrics analyzing engine 312 can provide metrics data 338 to other engines or devices for further use. Metrics data 338 from multiple songs can be compared and further analyzed, such as to determine correlations between multiple songs.

In an example, a song metrics analyzing engine 312 can be used on a set of songs to generate metrics data 338 regarding the key signatures, chords, notes, tempos, and other musical properties of each song in the set. Comparison of the metrics data 338 can be used to order the songs (e.g., for a playlist or an album) in a meaningful way. For example, metrics data 338 can be used to order similar songs adjacent one another. In another example, metrics data 338 can be used to order songs so that similar songs (e.g., with similar chord or note distributions, similar tempos, similar keys, or other similar characteristics) are not directly adjacent one another (e.g., to improve variety in a playlist or album).

The ability to obtain audio data 302 and associated metadata 304, as well as to use the audio data 302, metadata 304, or both brings substantial benefit to music enthusiasts, including performers, technicians, and listeners alike. For example, the use of an audio processor 108 having an automatic start/stop engine 110 as described in FIG. 1 can simplify the recording process for a musician. As another example, the ability to analyze incoming audio data to generate metadata (e.g., metadata 126 generated by the audio analyzing engine 114 of FIG. 1) can enable many different uses of the recordings or live performances (e.g., as seen in FIG. 3). Furthermore, the aspects described herein can enable musicians to record, analyze, and manipulate their music in new and unique ways.

Figure 4:
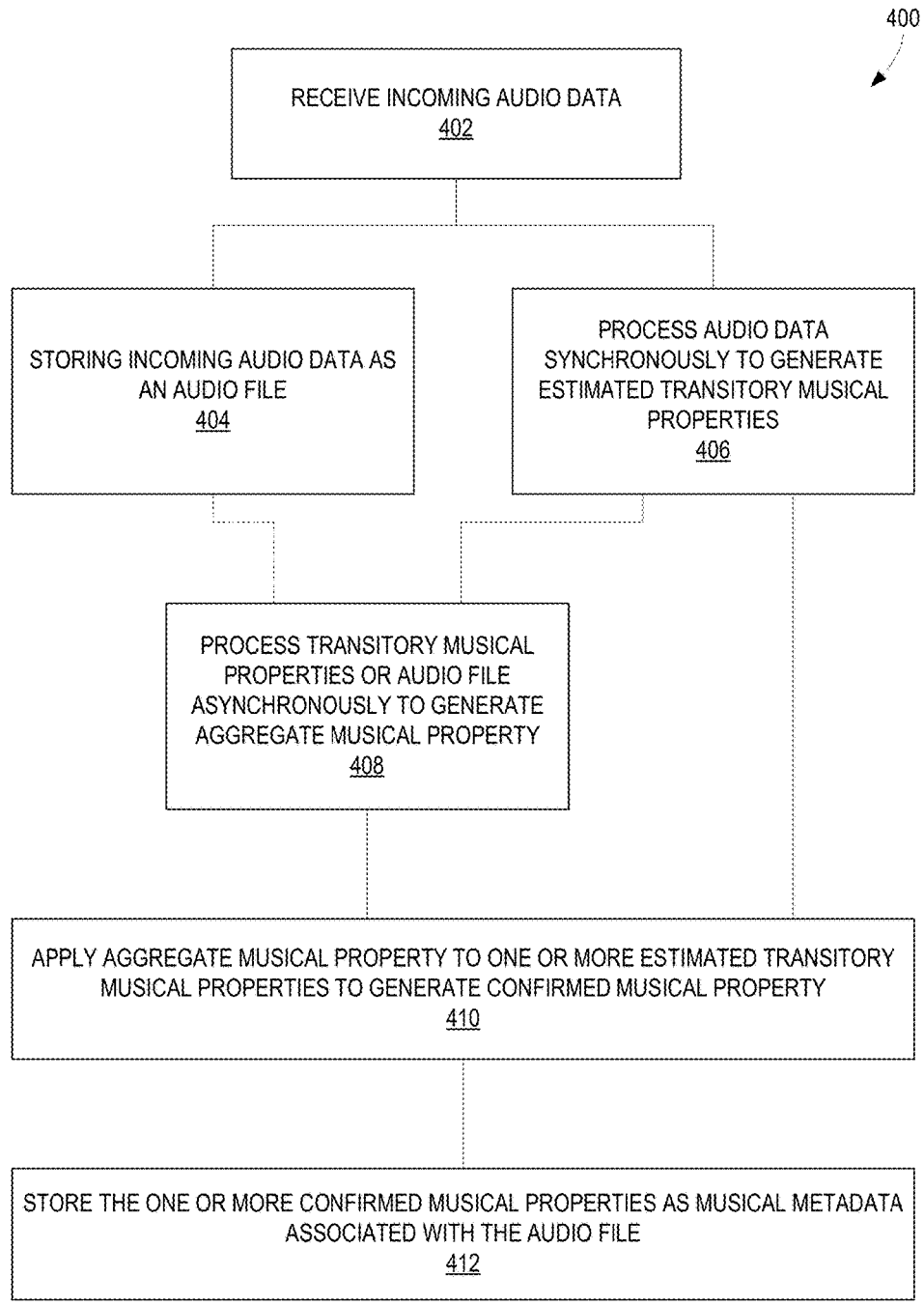
FIG. 4 is a flowchart depicting a process for analyzing audio data according to certain aspects of the present disclosure.

FIG. 4 is a flowchart depicting a process 400 for analyzing audio data according to certain aspects of the present disclosure. The process 400 can be performed by any suitable device or devices, such as the audio processing system 100 of FIG. 1.

At block 402, incoming audio data can be received. Incoming audio data can be any received data representative of an audio signal. In some cases, incoming audio data can be received from a microphone input, a line input, or a data connection. A data connection includes a connection to internal storage, external storage, or remote storage (e.g., through a network connection).

The incoming audio data can be received for a duration. The duration can correspond to all or part of the length of the recording, the length of the audio file, the length of music being played, or other such length of time. In some cases, when an audio buffer (e.g., audio buffer 116 of FIG. 1) is used, receiving incoming audio data 402 can additionally include receiving buffered audio data, which can correspond to a buffer duration (e.g., 2.5 seconds).

In an example, upon receiving a trigger signal, process 400 can commence by receiving 2.5 seconds of buffered audio data and beginning to receive incoming audio data for a duration of 50 seconds. When stored as an audio file, such as described below with reference to block 404, the audio file can include the 2.5 seconds of buffered audio data followed by the 50 seconds of received incoming audio data, resulting in a 52.5 second long audio file.

At block 404, the incoming audio data can be stored as an audio file. Any suitable uncompressed or compressed (e.g., lossless or lossy) format can be used for the audio file. As described above, in some cases, storing the incoming audio data as an audio file includes appending incoming audio data to buffered audio data. In some cases, storing incoming audio data can include appending an existing audio file.

At block 406, incoming audio data is processed synchronously with receiving the incoming audio data to generate estimated transitory musical properties. Synchronous processing can refer to processing that occurs at the same or approximately the same rate or speed as the incoming audio data (e.g., rate of receiving live audio data or the rate of a pre-recorded piece if the pre-recorded piece were being played in realtime). Synchronous processing may be referred to as realtime or dynamic processing. In some cases, synchronous processing can refer to processing occurring simultaneously with receiving incoming audio data at block 402, although that need not be the case. In some cases, the synchronous processing can occur delayed from receiving the incoming audio data at block 402.

The synchronous processing can be performed by a transitory analyzer designed to generate (e.g., determine) one or more estimated transitory musical properties corresponding to the incoming audio data. A transitory musical property can be any musical property of a moment of the incoming audio data. For example, a transitory musical property can be one or more notes being played at a particular moment in the incoming audio data, one or more chords being played, a beat (e.g., drumbeat), or any other musical property of a particular moment. Upon completion of the synchronous processing at block 406, a plurality of estimated transitory musical properties may have been generated across the duration of the audio file.

In an example, a melody transcription of a single guitar solo can include transitory musical properties that are individual notes being played at particular moments during the duration of the piece. In another example, a piano piece being played can include transitory musical properties that are chords being played at particular moments during the duration of the piece.

Musical properties determined during synchronous processing may be estimated transitory musical properties. For example, when determining a chord transcription for audio data, the estimated transitory musical properties may include chord estimates (e.g., one or more possible chords that could fit the recorded audio data for that moment), which can later be used to determine the chord transcription. In an example, if synchronous processing detects a C note, an E note, and a G note at a particular moment, there are numerous possible chords that could fit the notes detected at that moment, such as a C major chord, a D ninth suspended fourth, and an F major ninth. In such an example, transitory musical properties for that moment can include data corresponding to the detected notes (e.g., the C, E, and G) as well as chord estimate data including each of the possible chords.

In some cases, synchronous processing can correspond to the sequential processing of individual moments of received audio data, as opposed to aggregate processing of an entire audio file where correlations and patterns between different moments are taken into account.

At block 408, the audio file saved at block 404 is processed asynchronously to generate one or more aggregate musical properties. Asynchronous processing can refer to processing that does not occur at the same or approximately the same rate or speed as the incoming audio data (e.g., rate of receiving live audio data or the rate of a pre-recorded piece if the pre-recorded piece were being played in real-time). Asynchronous processing can refer to the aggregate processing of the transient musical properties of an entire audio file or an entire audio file itself, which can include taking into account correlations and patterns between different moments of transient musical properties of the audio file or audio data of the audio file. Asynchronous processing may be referred to as non-realtime or offline processing. In some cases, asynchronous processing can refer to processing occurring after receiving incoming audio data at block 402 has been fully completed, although that need not be the case. In some cases, the asynchronous processing can occur progressively as the incoming audio data is being received at block 402, and may complete after the incoming audio data has been fully received at block 402. For example, determination of an aggregate musical property (e.g., musical key estimate) can occur progressively, where a musical key estimate is made after several moments have been analyzed, but where the musical key estimate is progressively improved, updated, or validated as additional moments are analyzed until the incoming audio data has been fully received.

The asynchronous processing can be performed by a musical property analyzer designed to generate (e.g., determine) one or more aggregate musical properties corresponding to the audio file. The musical property analyzer can use the transient musical properties (e.g., as estimated at block 406) to generate one or more aggregate musical properties. In some cases, the musical property analyzer can additionally, or instead of the transient musical properties, use the audio data in the audio file itself (e.g., as stored at block 404) to generate the one or more aggregate musical properties. An aggregate musical property can be any musical property corresponding to an extended duration (e.g., several or more moments) of the audio file. In some cases, an aggregate musical property corresponds to the entirety of the audio file. Examples of aggregate musical properties can include a musical key, a mode, a chord progression, a repeating pattern (e.g., melodic, harmonic, or rhythmic), beats, tempos, downbeats, or any other musical property of an extended duration of the audio file. Upon completion of the asynchronous processing at block 408, one or more aggregate musical properties may have been generated for the audio file. When multiple aggregate musical properties are generated, they can be different types of aggregate musical properties generated for the same extended duration (e.g., a musical key and a chord progression for the entire audio file), the same types of aggregate musical properties generated for different extended durations (e.g., musical key estimates for the first half and second half of an audio file), or any combination thereof.

In an example, a musical piece can be processed asynchronously by the musical property analyzer to determine a musical key estimate. The musical key estimate can be determined by comparing the various notes or chord estimates (e.g., transitory musical properties) detected across the duration of the audio file with the available notes or chord estimates included in each of a plurality of possible musical keys. In some cases, the number of times a detected note or chord appears in the transitory musical properties for the entire audio file can be used to weight its importance in determining the musical key estimate. For example, if a particular audio file includes many instances of the notes A, B, C, D, E, F#, and G, the musical property analyzer may determine that the most likely key is either G major or E minor. If the G occurs many more times than the E, the musical property analyzer may assume G is the tonic and determine that the key is likely G major. Additionally, the detection of particular chords can inform the decision of the most likely key. Also, if a particular note is detected rarely in the audio file, such as an C#, the musical property analyzer may determine that the rare note is an out-of-key note and therefore give that note little to no weight in determining the most likely musical key.

In some cases, the musical property analyzer can determine a musical key by analyzing chord estimates and likely chord progressions in an audio file (e.g., as present in the estimated transitory musical properties corresponding to the audio file). The musical property analyzer can assign stronger weights to more common chord progressions (e.g., I-IV-V-I or I-V-vi-IV) and lower weights to less common chord progressions (e.g., I-ii-V-iii-V-vi). For example, if a particular audio file includes an E minor chord followed by a C major chord followed by a D major chord, the musical property analyzer may determine that if the key were E minor, the chord progression would be i-VI-VII, however if the key were G major, the chord progression would be vi-IV-V. The musical property analyzer may determine that the likelihood of a i-VI-VII chord progression is stronger than the likelihood of a vi-IV-V chord progression and make a determination that he musical key is E minor.

In some cases, when determining a musical key, the musical property analyzer may determine that the musical key can be either of two relative keys, rather than determining which of two relative keys.

At block 410, the one or more aggregate musical properties are applied to one or more estimated transitory musical properties to generate one or more confirmed musical properties. A confirmed musical property is any musical property that has been updated or confirmed based on a comparison of one or more aggregate musical properties with one or more estimated transitory musical properties. Applying an aggregate musical property to an estimated transitory musical property can include determining whether a value of the estimated transitory musical property fits the aggregate musical property.

For example, for a particular moment in an audio file, an estimated transitory musical property can include chord estimate data including several possible chords (e.g., C major, D ninth suspended fourth, F major ninth, and others) and an aggregate musical property can include a musical key estimate of F major. Based on the musical key estimate of F major, a determination can be made that the correct chord for that particular moment is the F major ninth chord. Alternatively, if the musical key estimate were instead C major, a determination may have been made that the correct chord for that particular moment is the C major chord.

In some cases, the aggregate musical properties may be applied to one or more estimated transitory musical properties for several adjacent moments. In the above example, several combinations of possible chord progressions can be generated based on the musical key estimate and the chord estimate data for the several adjacent moments. These combinations of possible chord progressions can be ranked by a weighting corresponding to their likelihood to occur in a piece. The most likely of the possible chord progressions can be selected and used to determine which of the possible chords is the correct chord for each of the several adjacent moments.

In the above examples, the chords identified as the correct chord for their particular moments can be considered confirmed musical properties. By applying one or more aggregate musical properties to one or more estimated transitory musical properties throughout the audio file, confirmed musical properties can be generated. In the above example, the determination of correct chords for various moments in an audio file can lead to the creation of a chord transcription for the piece represented by the audio file.

At block 412, the one or more confirmed musical properties are stored as musical metadata associated with the audio file.

Figure 5:
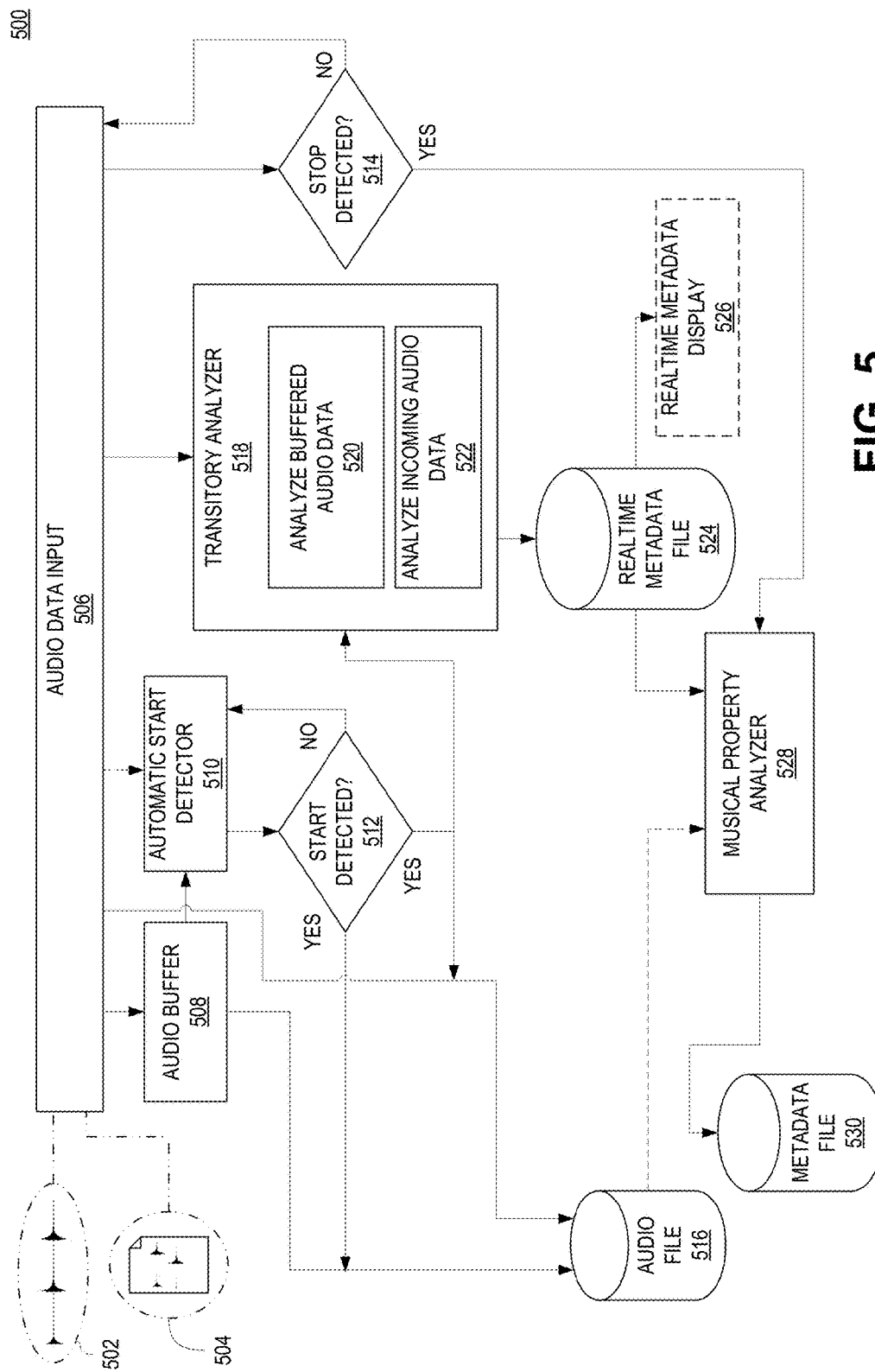
FIG. 5 is a block diagram depicting an audio processing system for generating audio metadata according to certain aspects of the present disclosure.

FIG. 5 is a block diagram depicting an audio processing system 500 for generating audio metadata according to certain aspects of the present disclosure. The audio processing system 500 can be similar to the audio processing system 100 of FIG. 1. The audio processing system 500 can include various components, each of which could be implemented in hardware or software. Each component of the audio processing system 500 depicted in FIG. 5 may be part of another component or may be further separable into subcomponents.

An audio data input 506 can receive incoming audio data, such as audio data from an audio signal 502 or an audio file 504. An audio buffer 508 can store a certain duration of the most recent incoming audio data. An automatic start detector 510 can receive incoming audio data directly from the audio data input 506 or from the audio buffer 508. The automatic start detector 510 can test whether a start event is detected at block 512. If no start event is detected at block 512, the automatic start detector 510 can continue to analyzing the incoming audio data to determine whether a start event is detected.

If a start event is detected at block 512, several actions can be triggered simultaneously or at approximately the same time. Upon detecting a start event, some or all of the contents of the audio buffer 508 can be written to an audio file 516. Upon detecting a start event, incoming audio data received at the audio data input 506 can be appended to the audio file 516 (e.g., after the buffered audio data). Upon detecting a start event, the transitory analyzer 518 can begin its analysis.

The transitory analyzer 518 can analyze incoming audio data at block 522, which can be processing that is synchronous with receiving the audio data at the audio data input 506. In some cases, the transitory analyzer 518 can simultaneously analyze the buffered audio data at block 520 while also analyzing the incoming audio data at block 522. In other cases, the transitory analyzer 518 can first analyze the buffered audio data at block 520, including any appended audio data (e.g., audio data appended to audio file 516) until reaching realtime, at which point the transitory analyzer 518 can continue by analyzing the incoming audio data 522 synchronously. In such cases, the analysis of buffered audio data and appended audio data can be performed faster than synchronously. In some cases, if the analysis of buffered audio data and appended audio data is not performed faster than synchronously, the transitory musical properties generated (e.g., determined) by the transitory analyzer 518 may be slightly delated from realtime.

The transitory analyzer 518 can generate transitory musical properties that are output to a realtime metadata file 524. The realtime metadata file can be a temporary file. The realtime metadata file includes transitory musical properties of the incoming audio data. In some cases, the transitory musical properties can be presented at a realtime metadata display 526. For example, while recording a piece through the system 500, a user may be presented with transitory musical properties, such as a melody transcription or chord estimate data. The transitory musical properties presented at a realtime metadata display 526 can be relatively accurate, but may be improved by further analysis by the musical property analyzer 528.

An automatic stop detector can determine whether or not a stop event has been detected at block 514. The automatic stop detector can be part of the transitory analyzer 518, part of the automatic start detector 510, part of another component, or its own component. If no stop event is detected at block 514, analysis and recording (e.g., appending of the audio file 516) may continue. If a stop event is detected at block 514, recording can cease, analysis of incoming audio data by the transitory analyzer 518 can cease, and the musical property analyzer 528 can begin its analysis. In some cases, the musical property analyzer 528 may begin its analysis prior to the stop event being detected.

The musical property analyzer 528 can determine one or more aggregate musical properties. In some cases, the one or more aggregate musical properties can be determined by analysis of the transitory musical properties in the realtime metadata file 524, analysis of the audio file 516, or any combination thereof. The musical property analyzer 528 can also apply the one or more aggregate musical properties to the transitory musical properties to generate the confirmed musical properties, which can be saved in a metadata file 530. The metadata file 530 can be integrated into or otherwise associated with the audio file 516, such as described herein.

Figure 6:
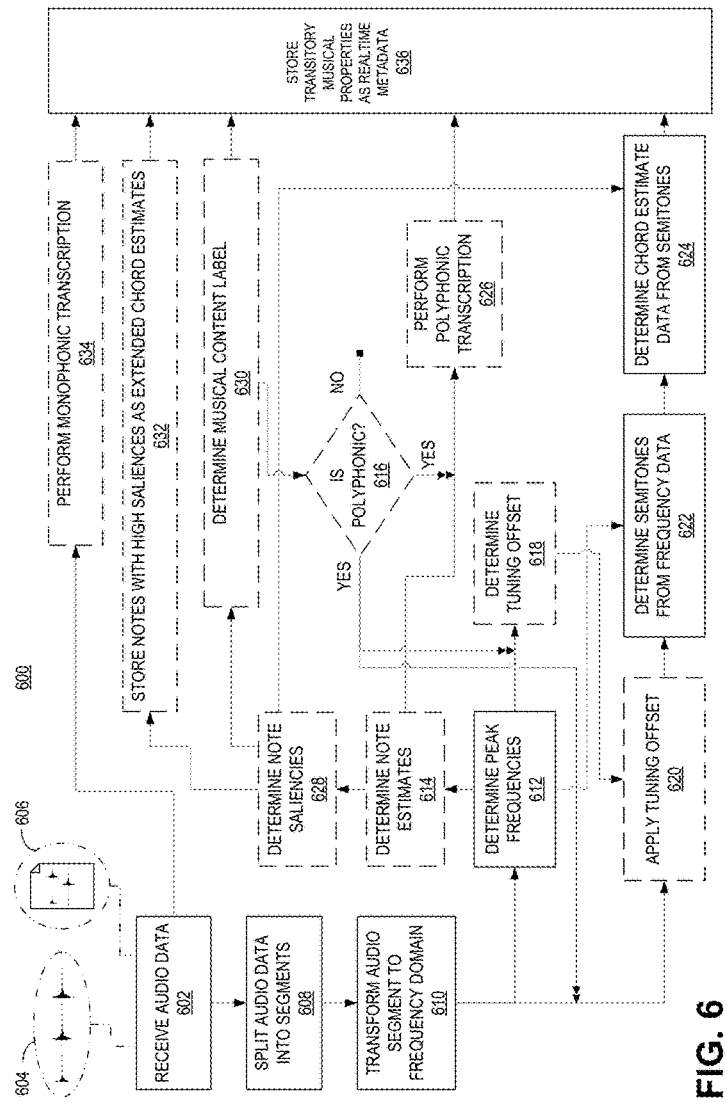
FIG. 6 is a block diagram depicting a process for analyzing transitory musical properties according to certain aspects of the present disclosure.

FIG. 6 is a block diagram depicting a process 600 for analyzing transitory musical properties according to certain aspects of the present disclosure. At block 602, incoming audio data is received, such as audio data from an audio signal 604 or an audio file 606.

At optional block 634, a monophonic transcription can be performed. The monophonic transcription can include transitory musical properties that are individual notes detected in the incoming audio data. The monophonic transcription can include information such as a note's beginning (e.g., starting time), a note's length, a note's pitch, and other such information. The monophonic transcription attempts to obtain information for one note at a time from the audio data, even if the audio data includes polyphonic sound (e.g., multiple notes at a time).

At block 608, the incoming audio data can be split into musically relevant segments. A musically relevant segment is a segment of audio data in which a musical event occurs (e.g., a note, a beat, a chord, or other musical event). Each segment may be unique (e.g., non-overlapping with adjacent segments). The incoming audio data can be split into segments based on transients detected in the incoming audio signal. Transients can be detected based on rhythmic events or volume events. Transients can relate to beats, groups of beats, measures, or the like. Blocks 610, 612, 614, 616, 618, 620, 622, 624, 626, 628, 630, and 632 may be performed for each audio segment. Transients can represent localized instances of sudden energy changes in the audio data.

At block 610, an audio segment is transformed from the time domain into the frequency domain, such as through a Fourier Transform, like a Short-Time Fourier Transform (STFT), resulting in frequency data. In some cases, the audio segment may be decimated or downsampled to reduce the bandwidth of the audio segment to a certain range of interest. For example, incoming audio data received at 44.1 kHz (e.g., 44,100 samples per second) can be downsampled to approximately 16 kHz (e.g., 16,000 samples per second). Downsampling can improve the speed of any blocks relying on the frequency data (e.g., blocks 612, 614, 616, 618, 620, 622, 624, 626, 628, 630, and 632). Downsampling can aid in performing process 600 synchronously with the receiving of incoming audio data. In some cases, downsampling can be used to process buffered audio data at a rate that is faster than synchronously with the receiving of incoming audio data.

At block 612, the frequency data is analyzed (e.g., by a frequency analyzer) to identify peak frequencies. Peak frequencies can be identified using a partial tracking process. A partial tracker can intensify frequency peaks in the frequency data, such as those related to notes and overtones present in the audio segment. The partial tracker can identify peak frequencies that are maintained over a portion of or all of the duration of the audio segment. These identified frequencies can be intensified and provided as partial tracker data.

At optional block 614, note estimates can be determined based on the peak frequencies identified at block 612 (e.g., the peak frequencies identified in partial tracker data). The note estimates can be determined by matching peak frequencies to fundamental frequencies of reference notes. Determining the note estimates at block 614 can result in note estimate data containing one or more potential notes.

At optional block 628, note saliences can be determined for each of the note estimates determined at block 614. Note saliences can be determined by identifying the number of occurrences of particular note estimates within an audio segment. For example, an audio segment of one second duration may comprise 100 STFT frames. If a particular note (e.g., an A at approximately 440 Hz) has occurred 65 times out of those 100 STFT frames, the note salience for that note estimate may be 65. Any note estimates having note saliences below a threshold may be discarded. The threshold may be static (e.g., a preset value) or dynamic (e.g., adjustable based on other factors, such as the number of note estimates total or the note saliences of other note estimates in the same audio segment). A note salience can be a weighting value for a particular note (e.g., a particular semitone).

At optional block 630, a musical content label can be determined. The determination can be made as to whether the audio segment is monophonic, polyphonic, or non-harmonic (e.g., drum beats and the like). The determination can be performed by assessing the note estimates having sufficiently high note saliences. For example, all notes estimates having a note salience at or above a certain threshold may be counted and the determination can be made that the segment is monophonic (e.g., only a single note estimate is counted), polyphonic (e.g., more than one note estimate is counted), or non-harmonic (e.g., no note estimates are counted). In some cases, a monophonic identification can be associated with melody and a polyphonic identification can be associated with harmony. The musical content labeling can be provided as a transitory musical property.

As part of or separate from block 630, optional block 616 can include determining the audio segment is polyphonic. The determination can be made by assessing the number of note estimates having sufficiently high note saliences (e.g., above the threshold). When more than one note estimate have sufficiently high note saliences, the audio segment can be considered polyphonic. When only a single note estimate has a sufficiently high note salience, the audio segment can be considered monophonic. When no note estimates have sufficiently high note saliences, the audio segment can be considered non-tonal (e.g., like a drum beat) and may be considered as not being harmonic. The double arrows extending from block 616 are indicative of a block optionally being dependent on whether or not the audio segment is determined to be polyphonic.

If a determination is made at block 616 that the audio segment is polyphonic, a polyphonic transcription can be performed at block 626. The polyphonic transcription can be based on the note estimates from block 614. The polyphonic transcription may be noisy data, but may be used later during subsequent processing. The polyphonic transcription can contain information about note beginnings, note lengths, note pitches, and other such information. The polyphonic transcription can be provided as transitory musical properties. In some alternate cases, a polyphonic transcription can be generated at block 626 using the note estimates having a sufficiently high note salience, based on the note saliences determined at block 628. In some cases, polyphonic transcription at block 626 is not dependent on whether a determination has been made at block 616.

If a determination is made at block 616 that the audio segment is polyphonic, a tuning offset can be determined at optional block 618. Determining the tuning offset can include selecting a target frequency by a target frequency selector. A target frequency selector can select one of the identified peak frequencies (e.g., the identified peak frequencies from block 612) from which to measure a tuning offset. A tuning offset can be a measurement of the amount that incoming audio data deviates from an expected tuning. For example, an A4 note present in the audio data is expected to have a frequency of approximately 440 Hz. However, due to inconsistencies in the tuning of an instrument (e.g., a guitar or piano string being tuned slightly incorrectly), detuning over time (e.g., detuning due to environmental factors or use of an instrument), or other factors (e.g., a tape playing being played at a slightly slower speed than it was recorded), an A4 note in the audio data may have a frequency that deviates from 440 Hz (e.g., a frequency of 435 Hz). This deviation may be perceptible or not perceptible by the human ear. This deviation, even if imperceptible by the human ear, may affect how the audio data is processed in subsequent steps (e.g., binning into semitones during generation of a pitch cloud profile). Audio data that contains any deviation from an expected tuning can be considered untuned, non-tuned, or detuned audio data. Audio data that matches an expected tuning (e.g., exactly or within an acceptable threshold) can be considered tuned audio data.

In some cases, a target frequency selector can determine correlation scores between each of the identified peak frequencies and each of one or more reference notes. The correlation score can correspond to a likelihood that the peak frequency corresponds to the reference note. The target frequency selector can then select the target frequency as the one having the highest of the correlation scores. In some cases, a single reference note is used. In some cases, multiple reference notes are provided.

In some cases, a target frequency selector can operate by first selecting a target frequency (e.g., a frequency having the strongest peak or most sustained peak), then determining correlation scores between that target frequency and several reference notes. The target frequency selector can then select the reference note having the highest correlation score with the target frequency.

In some cases, a target frequency is selected and semitone distances are added to or subtracted from the target frequency until the resultant frequency is close to a reference frequency (e.g., A4 at 440 Hz).

Once a target frequency, and optionally a reference note, is selected, a tuning offset can be determined by calculating a difference in frequency between the target frequency and the known frequency of the reference note. For example, a reference note that is an A4 (e.g., an A at 440 Hz) can be compared to a target frequency identified in the audio segment that is an A at 435 Hz. The tuning offset can then be 5 Hz, at least at A4.

In some cases, multiple tuning offsets can be determined during one or more segments. Statistical information about the multiple tuning offsets can be determined, such as an average and a standard deviation. If the deviation comes to a convergence, an inference can be made that a stable tuning reference is achieved.

In some cases, separate tuning offsets can be determined for various frequency windows. For example, frequency windows corresponding to strings of an instrument (e.g., a guitar) can be set such that different tuning offsets are used for each string. In some cases, a single tuning offset is used for all frequencies (e.g., for a string instrument, assuming that all strings are tuned to each other).

In some cases, a single tuning offset can be used for an entire piece, such as a multi-instrument piece played from a tape player. Some tape players may induce slight detuning due to inaccuracies in feeding or turning speed, and thus the amount of detuning may be constant across the entire duration of the piece and across all instruments of the piece.

In some cases, tuning offsets can be determined during the course of one or more recording sessions and stored as historical data. If a trend is seen in the historical data, an inference regarding progressive detuning can be made and a current tuning offset can be adjusted to compensate for the progressive detuning. For example, if during a long song or during a single session of recording several audio files the tuning offset is determined to progressively increase (e.g., at a proportional rate, such as 1 Hz per X minutes or per Y notes), future tuning offsets can be predicted or adjusted in order to compensate for predicted future detuning (e.g., another 1 Hz change after another X minutes or another Y notes).

At optional block 620, the tuning offset can be applied to take into account the detuning detected at block 618. In some cases, a tuning offset is not applied at block 620 until after a stable tuning reference is achieved (e.g., through statistical analysis).

Applying the tuning offset can include adjusting the incoming frequency data (e.g., frequency data from block 610) or adjusting how the incoming frequency data is analyzed. For example, when adjusting the incoming frequency data, the detected frequencies can be shifted by amounts calculated based on the tuning offset. As another example, when the way the incoming frequency data is analyzed is being adjusted, a benchmark frequency value (e.g., 440 Hz for an A4) can be shifted by amounts calculated based on the tuning offset (e.g., shifted from 440 Hz to 435 Hz if the tuning offset is 5 Hz) in order to provide a new benchmark frequency value against which the incoming frequency data can be compared. Similarly, in some cases, the windows used to analyze the incoming frequency data can include upper and lower benchmark frequency values (e.g., between 428 Hz and 453 Hz for an A4) which can be adjusted based on the tuning offset. By adjusting the way incoming frequency data is analyzed, adjustments to the live incoming frequency data do not need to be constantly calculated.

As described herein, applying the tuning offset can include simply adding the tuning offset to the frequency data (e.g., adding 5 Hz to a 435 Hz frequency to reach A4). The tuning offset can be adjusted based on the frequency needing the offset, due to the non-linear relationship between frequency and pitch. For example, using a 5 Hz tuning offset at A4, the tuning offset at C5 (e.g., 3 half steps away, normally approximately 523.3 Hz) may be approximately 5.95 Hz (e.g., the C5 frequency needing the same amount of tuning correction as the A4 example above may be approximately 517.4 Hz). The formula for determining the tuning offset is shown in Equation 1, where $offset_0$ is the initial tuning offset determined at block 618, n is the number of half steps above the reference note used to determine the tuning offset at block 618 where the frequency to be adjusted is located (e.g., n is a negative number when peak frequency to be adjusted is located below the reference note), and of $f\,set_n$ is the tuning offset to be used for the frequency to be adjusted.

$$offset_n = offset_0 * 2^{1/12^n} \qquad \text{Equation 1}$$

The frequency data adjusted based on the tuning offset can be considered adjusted frequency data.

In some alternate cases, the tuning offset can be applied to the peak frequencies identified at block 612 (e.g., the peak frequencies identified in partial tracker data) instead of the frequency data directly from block 610. In such cases, the tuning offset can be applied to specific peak frequencies rather than all frequencies. In such cases, the peak frequencies that have been adjusted can be considered adjusted peak frequencies.

As described herein, applying the tuning offset at block 620 can include adjusting how the frequency data is analyzed, such as adjusting any benchmark frequency values (e.g., frequencies of reference notes or upper or lower bounds for windows used to analyze the frequency data). The amount of adjustment can be calculated similarly to as described above with reference to Equation 1. In some cases, applying the tuning offset at block 620 can include adjusting benchmark frequency values used by subsequent blocks, such as adjustment to the window boundaries used to identify semitones at block 622, as described below.

As described above with reference to blocks 618 and 620, a tuning offset can be determined and used for other purposes outside of the process 600 shown in FIG. 6. Blocks 618 and 620 may be performed absent any determination of an audio segment being polyphonic when blocks 618 and 620 are used outside of process 600. Any operation or device relying on accurate frequency data can include a determination of one or more tuning offsets, such as through the use of some or all of blocks analogous to blocks 602, 608, 610, and 612 along with a block analogous to block 618, and the application of the tuning offset(s) (e.g., using a block analogous to block 620).

At block 622, semitones can be identified from the frequency data from block 610. If a tuning offset was applied to the frequency data, the semitones identified at block 622 can be identified from the adjusted frequency data as corrected at block 620 or semitones can be identified at block 622 using unadjusted frequency data being analyzed by adjusted semitone windows (e.g., with upper and lower limits adjusted at block 620). Semitones can be identified by generating a pitch class profile (PCP) that is a semitone-time representation of the audio segment.

A PCP can be generated by measuring the amount of energy falling within each of a number of semitone windows. The number of semitone windows can be preset or automatically adjusted (e.g., based on the frequency range of the frequency data from block 610). Each semitone window can extend from a first frequency to a second frequency (e.g., from a lower benchmark frequency value to an upper benchmark frequency value). For example, a semitone window for A4 can extend from approximately 428 Hz to approximately 453 Hz. The energies of any frequencies falling between 428 Hz and 453 Hz can then be used to determine an energy value for the pitch class A4 of the PCP. An energy value for a pitch class can be a summation, average, or other function or combination of functions of all the energies of the frequencies that fall in the semitone window. This process can be repeated for all frequencies in the frequency data. In some cases, each semitone window can be defined by a windowing function (e.g., other than rectangular, such as a triangular, Hann, Hamming, or other window) to improve the accuracy of the PCP.

In some cases, a simplified PCP can be combined (e.g., via superposition) with the pitch class profile to improve the signal to noise ratio of the PCP, or used instead of the PCP. A simplified PCP can be based on the peak frequencies determined at block 612, rather than based on the frequency data directly from block 610. The simplified PCP can be generated in the same fashion as the PCP, or simply by selecting the closest semitone to a particular peak frequency. The identified semitones can be provided as a simplified PCP that is a semitone-time representation of the audio segment. In some cases, the simplified PCP can be based on the note estimates from block 614. In some cases, the simplified PCP can be based on only note estimates or peak frequencies meeting specific criteria, such as sufficient energy, duration, or other such qualities. Superposition of a PCP with a simplified PCP can result in a PCP where harmonically stable elements are favored over other spectrum elements. In some cases, the use of both a PCP and a simplified PCP allow for harmonically stable elements to be favored, while still capturing possible pitch classes that may be relevant, but may be associated with frequencies without sufficiently high energy to be identified as a peak frequency (e.g., light overtones, quiet notes, or short notes).

At block 624, chord estimate data can be determined from the identified semitones. In some cases, a chroma analysis is performed on the identified semitones (e.g., the PCP) to reduce the set of all semitones to a smaller set of pitch classes. For example, an audio segment identified as having semitones including C3, F3, C4, F4, C5, and F5 may be described as having a set of pitch classes including C and F. The chroma analysis can include folding down or folding up all octaves of a single pitch class so that all of the energy values of all octaves of a single pitch class are identified as that single pitch class. In other words, the chroma analysis acts as a binning operation to bin all identified semitones into a single chroma. In some cases, chroma analysis can include normalization.

By comparing the identified semitones or the set of pitch classes to a set of known chords, a set of possible chords can be generated. The set of possible chords can include every chord that fits with the semitones or pitch classes identified in the audio segment. In other words, each chord of the set of known chords that contains all of the pitch classes is identified as being a possible chord. In some cases, the set of known chords can be limited to only traditional chords, such as only major or minor chords, and in some cases, only triads. These possible chords can be provided as a list of chord estimates, or chord estimate data. The chord estimate data can be provided as transitory musical properties.

At optional block 632, notes having high saliences can be stored as extended chord estimates. The extended chord estimates can be provided as transitory musical properties. The extended chord estimates can include notes not present in the identified chord estimates, but may nonetheless add to form a different chord. For example, when a chord estimate includes a C major chord (e.g., C, E, and G), the chord estimate data may include a B if a B is identified in the audio segment, corresponding to a C Major seventh chord.

At block 636, the transitory musical properties obtained can be stored as realtime metadata 636. Examples of the transitory musical properties that were obtained through process 600 can include the monophonic transcription from block 634, the extended chord estimates from block 632, the melody or harmony label from block 630, the polyphonic transcription from block 626, and the chord estimate data from block 624. In some cases, the transitory musical properties include at least the chord estimate data from block 624.

Figure 7:
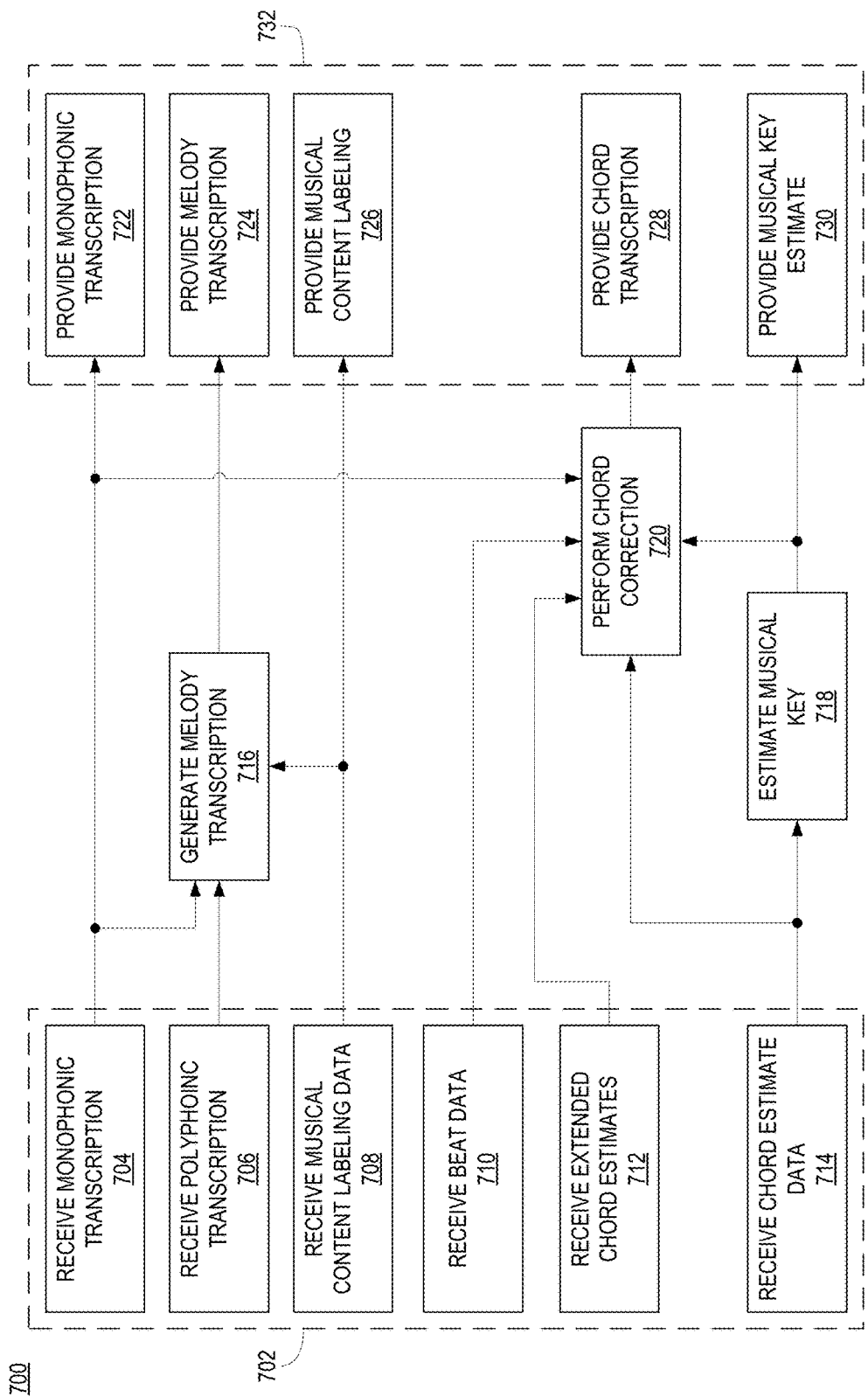
FIG. 7 is a block diagram depicting a process for analyzing musical properties, including aggregate musical properties, according to certain aspects of the present disclosure.

FIG. 7 is a block diagram depicting a process 700 for analyzing musical properties, including aggregate musical properties, according to certain aspects of the present disclosure. The process 700 can take estimated transitory musical properties 702 as input and output confirmed musical properties 732.

At block 704, a monophonic transcription can be received. The monophonic transcription can be provided at block 722 as one of the confirmed musical properties 732.

At block 716, the monophonic transcription received at block 704 can be used with a polyphonic transcription received at block 706 to generate a melody transcription. The melody transcription can be a combination of content from both the monophonic transcription and the polyphonic transcription. In some cases, musical content labeling data received at block 708 can be used to aid in generating the melody transcription. The melody transcription generated at block 716 can include content from the monophonic transcription received at block 704 when the music content labeling indicates that the content of that particular segment is monophonic and content from the polyphonic transcription received at block 706 when the music content labeling indicates that the content of that particular segment is polyphonic. The melody transcription may include silent sections (e.g., having no content from either the melody or polyphonic transcriptions received at block 704 and 706) when the music content labeling indicates that the content of a particular segment is non-harmonic (e.g., rhythmic). The melody transcription generated at block 716 can be provided at block 724 as one of the confirmed musical properties 732. The musical content labeling data received at block 708 can be provided at block 726 as one of the confirmed musical properties 732.

At block 714, chord estimate data can be received. At block 718, a musical key (e.g., a key signature) can be estimated using the chord estimate data received at block 714. The key can be estimated as described in further detail above. In some cases, each possible musical key can be given a score corresponding to the likelihood that the potential chords in the chord estimate data for some or all the audio segments fit with the given key. The musical key having the highest score can be selected as the estimated musical key. The estimated musical key can be provided as a musical key estimate at block 730 as part of the confirmed musical properties 732.

The chord estimate data received at block 714 can be used at block 720 to perform chord correction. Chord correction can include selection of the most likely chord out of the chord estimates and any additional correction necessary to determine the correct chord associated with the audio segment. In some cases, the chord correction performed at block 720 uses only the chord estimate data from block 714 and the musical key estimate from block 718.

In some cases, chord correction also makes use of beat data received at block 710. The beat data can include any data related to the beats of an audio file, such as knowledge of when beats occur and when a bar occurs. For example, the beat data can include information used to identify the timing of downbeats. When used to aid in chord correction at block 720, the beat data can be used to select the most likely chord based on an assumption that chords tend to begin on a beat or downbeat. For example, chords or notes beginning on a downbeat may be given a higher weight than those not beginning on a downbeat.

In some cases, chord correction also makes use of the monophonic transcription received at block 704. When monophonic transcription is used to aid in chord correction at block 720, the monophonic transcription can be used to select the most likely chord based on an assumption that the note of the monophonic transcription tends to be the rot note of the correct chord. For example, chords having a root note matching the note of the monophonic transcription can be given a higher weight than those not having a matching root note. In some cases, the monophonic transcription and the beat data can be combined to select the a particular note of the monophonic transcription to use as a presumed root note.

In some cases, extended chord estimates received at block 712 can be used to aid in chord correction at block 720. The extended chord estimates can be used to determine if a given chord should in fact be an alternate variant of the given chord. For example, the presence of an extension of addition to a chord in the extended chord estimate data can be indicative that the chord selected at block 720 should include that extension or addition.

The chord correction performed at block 720 can make use of any combination of musical key estimates, extended chord estimates, beat data, chord estimate data, and monophonic transcription.

The chords selected during chord correction at block 720 can be provided as a chord transcription at block 728. The chord transcription can include several selected chords associated with several audio segments of the audio data.

The melody transcription generated at block 716 and the musical key estimated at block 718 can be considered aggregate musical properties. In some cases, the beat data received at block 710 can be considered an aggregate musical property. Other aggregate musical properties can be used to generate or validate the confirmed musical properties 732.

Figure 8:
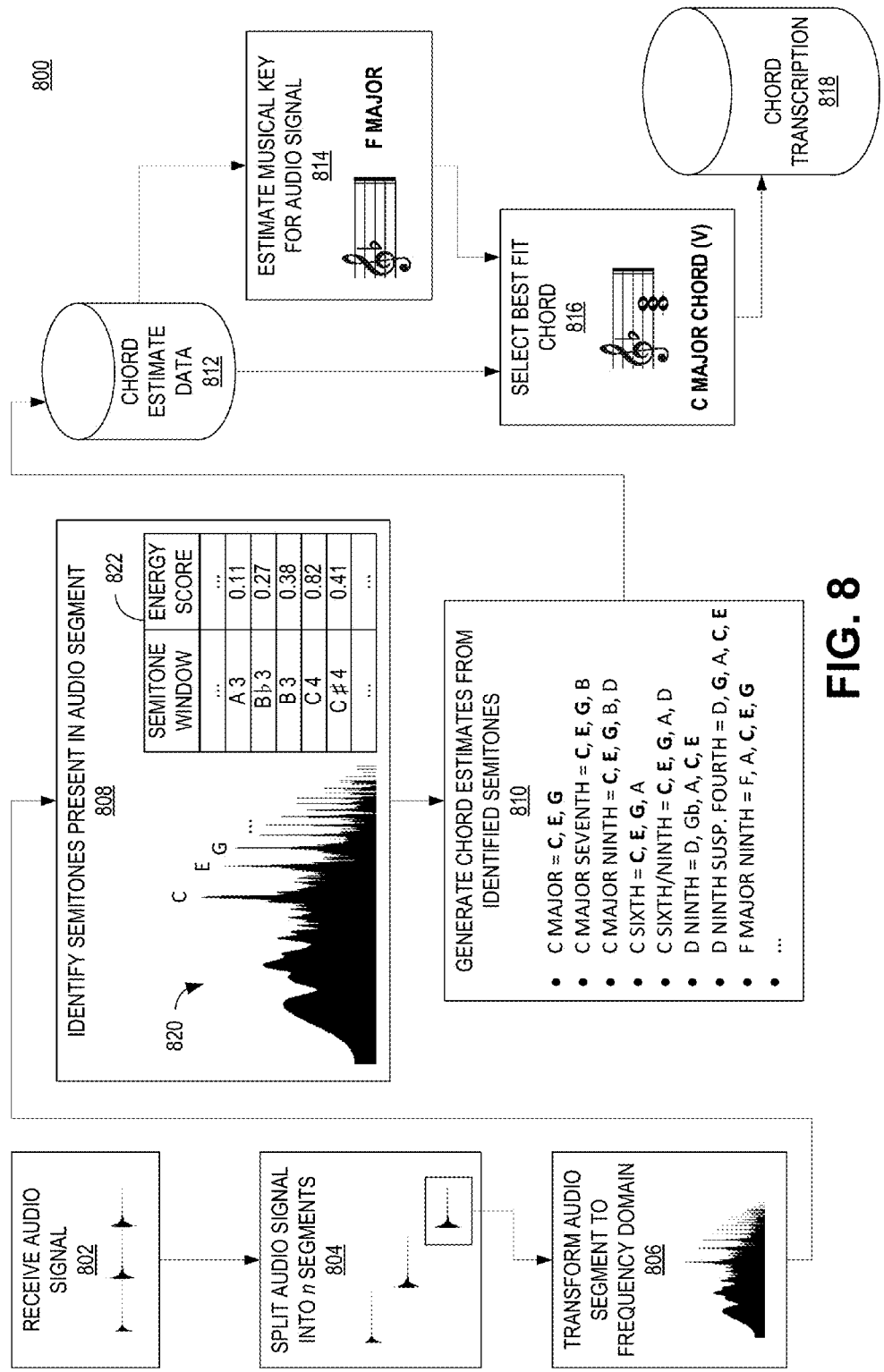
FIG. 8 is a flowchart depicting a process for analyzing an audio signal according to certain aspects of the present disclosure.

FIG. 8 is a flowchart depicting a process 800 for analyzing an audio signal according to certain aspects of the present disclosure. At block 802, an audio signal is received. At block 804 the audio signal is split into audio segments (e.g., n segments). Blocks 806, 808, 810, and 812 can be performed for each audio segment.

At block 806, an audio segment is transformed from the time domain to the frequency domain as frequency data. At block 808, semitones present in the audio segment are identified. The semitones can be identified by identifying peak frequencies in the frequency data 820. The frequency data can be manipulated in various ways as described herein in order to more easily identify semitones (e.g., pitch classes), including the application of tuning adjustment. In the example shown, the notes C, E, and G have been identified. Additional notes may be identified as well.

In some cases, semitones can be identified as present in the audio segment by measuring the energy of the frequency data 820 in several semitone windows and generating a pitch class profile 822. The pitch class profile 822 can include an energy score for each semitone window present in the frequency data 820. The pitch class profile 822 can be generated as described herein and can be further manipulated as described herein, such as through a chroma analysis (e.g., to generate an energy score corresponding to all "A" notes, including A1, A2, A3, A4, A5, etc.).

The semitones identified in block 808 can include all semitones present in the audio segment (e.g., C4, E4, G4 , C5, E5, and G5) or can include only a chroma of the semitones identified in the audio segment (e.g., C, E, and G).

At block 810, chord estimates are generated from the identified semitones. In the example shown, the C, E, and G notes are shown to correspond with a number of possible chords. These possible chords are saved as chord estimate data at block 812.

At block 814, a musical key for the audio signal can be estimated. The musical key can be based on the chord estimate data from each of the n segments of the audio signal. In the example shown, the musical key is estimated as being F Major.

At block 816, a best fit chord is selected for each of the chord estimates identified for each of the n segments. In the example shown, the best fit chord is selected as being a C Major chord, which corresponds to the V chord in an F Major key. At block 818, the best fit chords for each of the n segments can be saved as a chord transcription for the audio signal.

Figure 9:
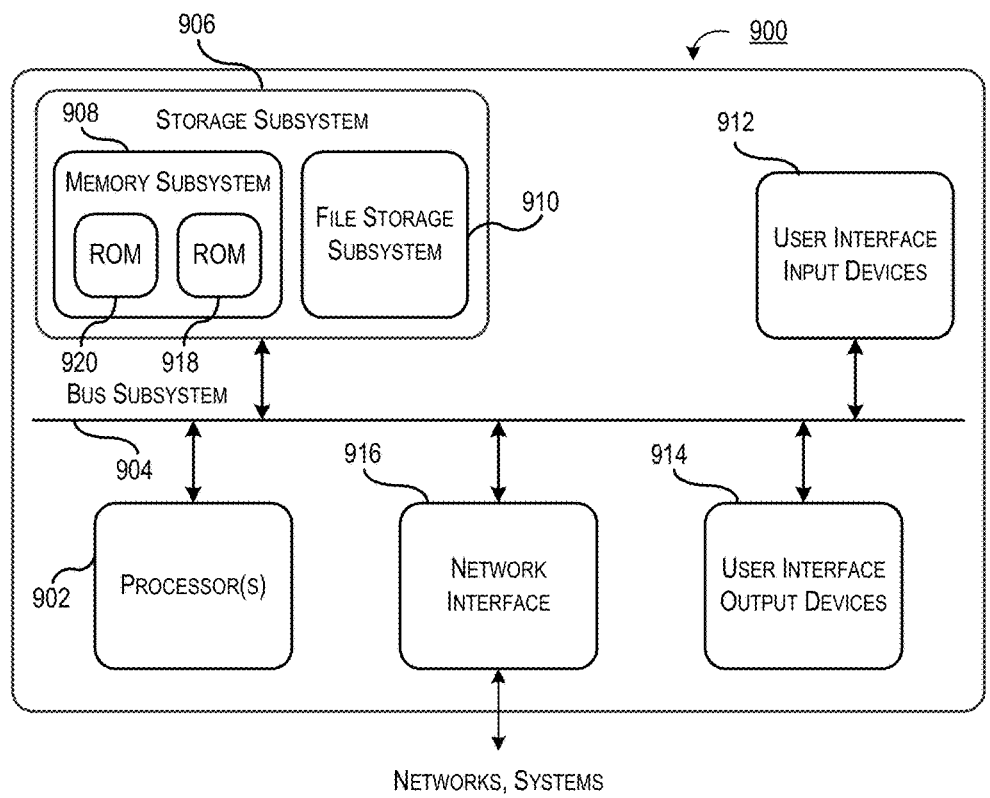
FIG. 9 is a simplified block diagram depicting a computer system that may incorporate components of various systems and devices described herein according to certain aspects of the present disclosure.

FIG. 9 is a simplified block diagram depicting a computer system 900 that may incorporate components of various systems and devices described herein according to certain aspects of the present disclosure. In some cases, a computing device can incorporate some or all of the components of computer system 900. Computer system 900 may include one or more processors 902 that communicate with a number of peripheral subsystems via a bus subsystem 904. These peripheral subsystems may include a storage subsystem 906, including a memory subsystem 908 and a file storage subsystem 910, user interface input devices 912, user interface output devices 914, and a network interface subsystem 916.

Bus subsystem 904 can provide a mechanism for allowing the various components and subsystems of computer system 900 communicate with each other as intended. Although bus subsystem 904 is shown schematically as a single bus, in some cases, the bus subsystem may utilize multiple busses.

Processor 902, which can be implemented as one or more integrated circuits (e.g., a conventional microprocessor or microcontroller), controls the operation of computer system 900. One or more processors 902 may be provided. These processors may include single core or multicore processors. In some cases, processor 902 can execute a variety of programs in response to program code and can maintain multiple concurrently executing programs or processes. At any given time, some or all of the program code to be executed can be resident in processor(s) 902 and/or in storage subsystem 906. Through suitable programming, processor(s) 902 can provide various functionalities described above.

Network interface subsystem 916 provides an interface to other computer systems and networks. Network interface subsystem 916 serves as an interface for receiving data from and transmitting data to other systems from computer system 900. For example, network interface subsystem 916 may enable computer system 900 to connect to one or more devices via the Internet. In some cases, network interface 916 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), GPS receiver components, and/or other components. In some cases, network interface 916 can provide wired network connectivity (e.g., Ethernet) in addition to or instead of a wireless interface.

User interface input devices 912 may include a keyboard, pointing devices such as a mouse or trackball, a touchpad or touch screen incorporated into a display, a scroll wheel, a click wheel, a dial, a button, a switch, a keypad, audio input devices such as voice recognition systems, microphones, eye gaze systems, and other types of input devices. In general, use of the term "input device" is intended to include all possible types of devices and mechanisms for inputting information to computer system 900. For example, in an iPhone®, user input devices 912 may include one or more buttons provided by the iPhone® and a touchscreen which may display a software keyboard, and the like.

User interface output devices 914 may include a display subsystem, indicator lights, or non-visual displays such as audio output devices, etc. The display subsystem may be a cathode ray tube (CRT), a flat-panel device such as a liquid crystal display (LCD), a projection device, a touch screen, and the like. In general, use of the term "output device" is intended to include all possible types of devices and mechanisms for outputting information from computer system 900. For example, a software keyboard may be displayed using a flat-panel screen.

Storage subsystem 906 provides a computer-readable storage medium for storing the basic programming and data constructs that provide the functionality of various aspects disclosed herein. Storage subsystem 906 can be implemented, e.g., using disk, flash memory, or any other storage media in any combination, and can include volatile and/or non-volatile storage as desired. Software (programs, code modules, instructions) that when executed by a processor provide the functionality described above may be stored in storage subsystem 906. These software modules or instructions may be executed by processor(s) 902. Storage subsystem 906 may also provide a repository for storing data used in accordance with the present invention. Storage subsystem 906 may include memory subsystem 908 and file/disk storage subsystem 910.

Memory subsystem 908 may include a number of memories including a main random access memory (RAM) 918 for storage of instructions and data during program execution and a read only memory (ROM) 920 in which fixed instructions are stored. File storage subsystem 910 may provide persistent (non-volatile) memory storage for program and data files, and may include a hard disk drive, a floppy disk drive along with associated removable media, a Compact Disk Read Only Memory (CD-ROM) drive, an optical drive, removable media cartridges, and other like memory storage media.

Computer system 900 can be of various types including a personal computer, a portable device (e.g., an iPhone®, an iPad®, and the like), a workstation, a network computer, a mainframe, a kiosk, a server or any other data processing system. Due to the ever-changing nature of computers and networks, the description of computer system 900 depicted in FIG. 9 is intended only as a specific example. Many other configurations having more or fewer components than the system depicted in FIG. 9 are possible.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., "Examples 1-4" is to be understood as "Examples 1, 2, 3, or 4").

Example 1 is a system, comprising one or more data processors and a non-transitory computer-readable storage medium containing instructions which, when executed on the one or more data processors, cause the one or more data processors to perform operations including: receiving incoming audio data for a duration; storing the incoming audio data as an audio file; processing the incoming audio data, synchronously with receiving the incoming audio data, by a transitory analyzer to generate one or more estimated transitory musical properties corresponding to the incoming audio data; processing the transitory musical properties, asynchronously with receiving the incoming audio data, by a musical property analyzer to generate an aggregate musical property corresponding to the audio file; applying the aggregate musical property to the one or more estimated transitory musical properties to generate a confirmed musical property; and storing the one or more confirmed musical properties as musical metadata associated with the audio file.

Example 2 is the system of example 1, wherein the aggregate musical property is a musical key estimate of the audio file for the duration.

Example 3 is the system of example 2, wherein the one or more transitory musical properties includes chord estimate data representing one or more possible chords present in the audio data at a moment in the duration, and wherein applying the aggregate musical property to generate the one or more confirmed musical properties includes using the musical key estimate to select a best fit chord from the one or more possible chords of the chord estimate data for the moment.

Example 4 is the system of example 1, wherein the one or more transitory musical properties includes chord estimate data representing one or more possible chords present in the audio data at a moment in the duration, wherein the aggregate musical property is an estimated chord progression, and wherein applying the aggregate musical property to generate the one or more confirmed musical properties includes using the estimated chord progression to select a best fit chord from the one or more possible chords of the chord estimate data for the moment.

Example 5 is the system of examples 1-4, wherein the one or more confirmed musical properties includes a chord transcription representing one or more chords present in the audio data for the duration of the audio data.

Example 6 is the system of examples 1-5, wherein the one or more transitory musical properties includes a monophonic transcription of the audio file for the duration of the audio data.

Example 7 is the system of examples 1-6, wherein the one or more transitory musical properties includes rhythmic data corresponding to a timing of beats in the audio data, and wherein applying the aggregate musical property to generate the one of more confirmed musical properties includes selecting the best fit chord using the rhythmic data.

Example 8 is the system of examples 1-7, wherein generating the one or more transitory musical properties includes separating an audio segment out of the audio data, determining that the audio segment is polyphonic, identifying a plurality of notes in the audio data, and generating a set of one or more possible chords for the audio segment using the plurality of notes.

Example 9 is the system of example 8, wherein generating the set of one or more possible chords includes generating a set of one or more possible primary chords and generating a set of one or more possible chord extensions.

Example 10 is the system of examples 1-9, wherein the operations further include processing buffered audio data by the transitory analyzer to generate one or more additional estimated transitory musical properties corresponding to the buffered audio data, wherein applying the aggregate musical property to generate the confirmed musical property includes applying the aggregate musical property to the one or more estimated transitory musical properties and the one or more additional estimated transitory musical properties to generate the confirmed musical property.

Example 11 is a computer-program product tangibly embodied in a non-transitory machine-readable storage medium, including instructions configured to cause a data processing apparatus to perform operations including: receiving incoming audio data for a duration; storing the incoming audio data as an audio file; processing the incoming audio data, synchronously with receiving the incoming audio data, by a transitory analyzer to generate one or more estimated transitory musical properties corresponding to the incoming audio data; processing the transitory musical properties, asynchronously with receiving the incoming audio data, by a musical property analyzer to generate an aggregate musical property corresponding to the audio file; applying the aggregate musical property to the one or more estimated transitory musical properties to generate a confirmed musical property; and storing the one or more confirmed musical properties as musical metadata associated with the audio file.

Example 12 is the computer-program product of example 11, wherein the aggregate musical property is a musical key estimate of the audio file for the duration.

Example 13 is the computer-program product of example 12, wherein the one or more transitory musical properties includes chord estimate data representing one or more possible chords present in the audio data at a moment in the duration, and wherein applying the aggregate musical property to generate the one or more confirmed musical properties includes using the musical key estimate to select a best fit chord from the one or more possible chords of the chord estimate data for the moment.

Example 14 is the computer-program product of example 11, wherein the one or more transitory musical properties includes chord estimate data representing one or more possible chords present in the audio data at a moment in the duration, wherein the aggregate musical property is an estimated chord progression, and wherein applying the aggregate musical property to generate the one or more confirmed musical properties includes using the estimated chord progression to select a best fit chord from the one or more possible chords of the chord estimate data for the moment.

Example 15 is the computer-program product of example 11-14, wherein the one or more confirmed musical properties includes a chord transcription representing one or more chords present in the audio data for the duration of the audio data.

Example 16 is the computer-program product of example 11-15, wherein the one or more transitory musical properties includes a monophonic transcription of the audio file for the duration of the audio data.

Example 17 is the computer-program product of example 11-16, wherein the one or more transitory musical properties includes rhythmic data corresponding to a timing of beats in the audio data, and wherein applying the aggregate musical property to generate the one of more confirmed musical properties includes selecting the best fit chord using the rhythmic data.

Example 18 is the computer-program product of example 11-17, wherein generating the one or more transitory musical properties includes separating an audio segment out of the audio data, determining that the audio segment is polyphonic, identifying a plurality of notes in the audio data, and generating a set of one or more possible chords for the audio segment using the plurality of notes.

Example 19 is the computer-program product of example 18, wherein generating the set of one or more possible chords includes generating a set of one or more possible primary chords and generating a set of one or more possible chord extensions.

Example 20 is the computer-program product of example 11-19, wherein the operations further include processing buffered audio data by the transitory analyzer to generate one or more additional estimated transitory musical properties corresponding to the buffered audio data, wherein applying the aggregate musical property to generate the confirmed musical property includes applying the aggregate musical property to the one or more estimated transitory musical properties and the one or more additional estimated transitory musical properties to generate the confirmed musical property.

Example 21 is a computer-implemented method, comprising receiving incoming audio data for a duration; storing the incoming audio data as an audio file; processing the incoming audio data, synchronously with receiving the incoming audio data, by a transitory analyzer to generate one or more estimated transitory musical properties corresponding to the incoming audio data; processing the transitory musical properties, asynchronously with receiving the incoming audio data, by a musical property analyzer to generate an aggregate musical property corresponding to the audio file; applying the aggregate musical property to the one or more estimated transitory musical properties to generate a confirmed musical property; and storing the one or more confirmed musical properties as musical metadata associated with the audio file.

Example 22 is the method of example 21, wherein the aggregate musical property is a musical key estimate of the audio file for the duration.

Example 23 is the method of example 22, wherein the one or more transitory musical properties includes chord estimate data representing one or more possible chords present in the audio data at a moment in the duration, and wherein applying the aggregate musical property to generate the one or more confirmed musical properties includes using the musical key estimate to select a best fit chord from the one or more possible chords of the chord estimate data for the moment.

Example 24 is the method of example 21, wherein the one or more transitory musical properties includes chord estimate data representing one or more possible chords present in the audio data at a moment in the duration, wherein the aggregate musical property is an estimated chord progression, and wherein applying the aggregate musical property to generate the one or more confirmed musical properties includes using the estimated chord progression to select a best fit chord from the one or more possible chords of the chord estimate data for the moment.

Example 25 is the method of example 21-24, wherein the one or more confirmed musical properties includes a chord transcription representing one or more chords present in the audio data for the duration of the audio data.

Example 26 is the method of example 21-25, wherein the one or more transitory musical properties includes a monophonic transcription of the audio file for the duration of the audio data.

Example 27 is the method of example 21-26, wherein the one or more transitory musical properties includes rhythmic data corresponding to a timing of beats in the audio data, and wherein applying the aggregate musical property to generate the one of more confirmed musical properties includes selecting the best fit chord using the rhythmic data.

Example 28 is the method of example 21-27, wherein generating the one or more transitory musical properties includes separating an audio segment out of the audio data, determining that the audio segment is polyphonic, identifying a plurality of notes in the audio data, and generating a set of one or more possible chords for the audio segment using the plurality of notes.

Example 29 is the method of example 28, wherein generating the set of one or more possible chords includes generating a set of one or more possible primary chords and generating a set of one or more possible chord extensions.

Example 30 is the method of example 21-29, further comprising processing buffered audio data by the transitory analyzer to generate one or more additional estimated transitory musical properties corresponding to the buffered audio data, wherein applying the aggregate musical property to generate the confirmed musical property includes applying the aggregate musical property to the one or more estimated transitory musical properties and the one or more additional estimated transitory musical properties to generate the confirmed musical property.

Example 31 is a system, comprising one or more data processors and a non-transitory computer-readable storage medium containing instructions which, when executed on the one or more data processors, cause the one or more data processors to perform operations including: receiving incoming audio data; splitting the audio data into a plurality of audio segments; processing each of the plurality of audio segments by a chord estimation analyzer to generate chord estimates for each of the plurality of audio segments, wherein generating chord estimates for a segment includes calculating a pitch class profile identifying semitones present in the audio segment and identifying one or more permutations of the semitones present in the audio segment that correlate to one or more possible chords; processing the chord estimates for at least two of the plurality of audio segments by a key estimation analyzer to generate a musical key estimate corresponding to the audio data; and applying the musical key estimate to the chord estimates for each of the plurality of audio segments by a chord transcription analyzer to generate a chord transcription for the audio data by selecting a best fit chord.

Example 32 is the system of example 31, wherein selecting the best fit chord by applying the musical key estimate to the chord estimates includes generating a confidence score for each of the chord estimates based on an accuracy of fitting the chord estimate with the musical key estimate, ranking each of the chord estimates based on the confidence score, and selecting the chord estimate having the highest confidence score.

Example 33 is the system of example 31 or 32, wherein the operations further include determining one or more possible chord progressions using the musical key estimate and the chord estimates of one or more of the plurality of audio segments, wherein selecting the best fit chord includes applying the musical key estimate and the one or more possible chord progressions to the chord estimates, and wherein the best fit chord fits at least one of the one or more possible chord progressions.

Example 34 is the system of examples 31-33, wherein the operations further include determining an estimated chord progression using the musical key estimate and the chord estimates of one or more of the plurality of audio segments, wherein selecting the best fit chord includes applying the musical key estimate and the estimated chord progression to the chord estimates, and wherein the best fit chord fits the estimated chord progression.

Example 35 is the system of examples 31-34, wherein the operations further include generating a monophonic transcription for the audio data, wherein generating the monophonic transcription includes performing monophonic pitch detection on each of the plurality of audio segments, and wherein selecting the best fit chord includes applying the monophonic transcription to the chord estimates.

Example 36 is the system of examples 31-35, wherein generating chord estimates for a segment further include generating chord extension data by identifying one or more semitones corresponding to a chord extension of the one or more possible chords.

Example 37 is a computer-program product tangibly embodied in a non-transitory machine-readable storage medium, including instructions configured to cause a data processing apparatus to perform operations including: receiving incoming audio data; splitting the audio data into a plurality of audio segments; processing each of the plurality of audio segments by a chord estimation analyzer to generate chord estimates for each of the plurality of audio segments, wherein generating chord estimates for a segment includes calculating a pitch class profile identifying semitones present in the audio segment and identifying one or more permutations of the semitones present in the audio segment that correlate to one or more possible chords; processing the chord estimates for at least two of the plurality of audio segments by a key estimation analyzer to generate a musical key estimate corresponding to the audio data; and applying the musical key estimate to the chord estimates for each of the plurality of audio segments by a chord transcription analyzer to generate a chord transcription for the audio data by selecting a best fit chord.

Example 38 is the computer-program product of example 37, wherein selecting the best fit chord by applying the musical key estimate to the chord estimates includes generating a confidence score for each of the chord estimates based on an accuracy of fitting the chord estimate with the musical key estimate, ranking each of the chord estimates based on the confidence score, and selecting the chord estimate having the highest confidence score.

Example 39 is the computer-program product of examples 37 or 38, wherein the operations further include determining one or more possible chord progressions using the musical key estimate and the chord estimates of one or more of the plurality of audio segments, wherein selecting the best fit chord includes applying the musical key estimate and the one or more possible chord progressions to the chord estimates, and wherein the best fit chord fits at least one of the one or more possible chord progressions.

Example 40 is the computer-program product of examples 37-39, wherein the operations further include determining an estimated chord progression using the musical key estimate and the chord estimates of one or more of the plurality of audio segments, wherein selecting the best fit chord includes applying the musical key estimate and the estimated chord progression to the chord estimates, and wherein the best fit chord fits the estimated chord progression.

Example 41 is the computer-program product of examples 37-40, wherein the operations further include generating a monophonic transcription for the audio data, wherein generating the monophonic transcription includes performing monophonic pitch detection on each of the plurality of audio segments, and wherein selecting the best fit chord includes applying the monophonic transcription to the chord estimates.

Example 42 is the computer-program product of examples 37-41, wherein generating chord estimates for a segment further include generating chord extension data by identifying one or more semitones corresponding to a chord extension of the one or more possible chords.

Example 43 is a computer-implemented method, comprising: receiving incoming audio data; splitting the audio data into a plurality of audio segments; processing each of the plurality of audio segments by a chord estimation analyzer to generate chord estimates for each of the plurality of audio segments, wherein generating chord estimates for a segment includes calculating a pitch class profile identifying semitones present in the audio segment and identifying one or more permutations of the semitones present in the audio segment that correlate to one or more possible chords; processing the chord estimates for at least two of the plurality of audio segments by a key estimation analyzer to generate a musical key estimate corresponding to the audio data; and applying the musical key estimate to the chord estimates for each of the plurality of audio segments by a chord transcription analyzer to generate a chord transcription for the audio data by selecting a best fit chord.

Example 44 is the method of example 43, wherein selecting the best fit chord by applying the musical key estimate to the chord estimates includes generating a confidence score for each of the chord estimates based on an accuracy of fitting the chord estimate with the musical key estimate, ranking each of the chord estimates based on the confidence score, and selecting the chord estimate having the highest confidence score.

Example 45 is the method of examples 43 or 44, further comprising determining one or more possible chord progressions using the musical key estimate and the chord estimates of one or more of the plurality of audio segments, wherein selecting the best fit chord includes applying the musical key estimate and the one or more possible chord progressions to the chord estimates, and wherein the best fit chord fits at least one of the one or more possible chord progressions.

Example 46 is the method of examples 43-45, further comprising determining an estimated chord progression using the musical key estimate and the chord estimates of one or more of the plurality of audio segments, wherein selecting the best fit chord includes applying the musical key estimate and the estimated chord progression to the chord estimates, and wherein the best fit chord fits the estimated chord progression.

Example 47 is the method of example 43-46, further comprising generating a monophonic transcription for the audio data, wherein generating the monophonic transcription includes performing monophonic pitch detection on each of the plurality of audio segments, and wherein selecting the best fit chord includes applying the monophonic transcription to the chord estimates.

Example 48 is the method of example 43-47, wherein generating chord estimates for a segment further include generating chord extension data by identifying one or more semitones corresponding to a chord extension of the one or more possible chords.

Example 49 is a system, comprising one or more data processors and a non-transitory computer-readable storage medium containing instructions which, when executed on the one or more data processors, cause the one or more data processors to perform operations including: receiving incoming audio data; splitting the audio data into a plurality of audio segments; processing the plurality of audio segments by a frequency analyzer to identify one or more peak frequencies in one of the plurality of audio segments; selecting a target frequency of an audio segment by a target frequency selector from the one or more peak frequencies, wherein the target frequency corresponds to a reference note having a reference frequency; processing the audio segment to determine a tuning offset including calculating a difference in frequency between the target frequency and the reference frequency; and applying the tuning offset using a frequency adjustor when the audio data includes untuned audio data.

Example 50 is the system of example 49, wherein selecting the target frequency includes determining correlation scores between each of the one or more peak frequencies and each of one or more reference notes, wherein determining a correlation score includes determining a likelihood that a peak frequency corresponds to a reference note; and choosing the target frequency form the one or more peak frequencies as having the highest of the correlation scores.

Example 51 is the system of example 49, wherein selecting the target frequency includes choosing a target frequency from the one or more peak frequencies; determining correlation scores between the target frequency and each of a plurality of reference notes, wherein determining a correlation score includes determining a likelihood that the target frequency corresponds to a reference note; and selecting the reference note from the plurality of references notes as having the highest of the correlation scores.

Example 52 is the system of examples 49-51, wherein selecting the target frequency further includes identifying that the target frequency falls within a preset frequency window, and wherein applying the tuning offset includes adjusting one or more benchmark frequency values when the one or more benchmark frequency values falls within the preset frequency window.

Example 53 is the system of example 52, wherein the operations further include determining an additional tuning offset for an additional target frequency that falls within an additional preset frequency window, wherein the additional preset frequency window corresponds to notes that do not fall within the preset frequency window, and wherein applying the tuning offset includes adjusting an additional one or more benchmark frequency values when the additional one or more benchmark frequency values falls within the additional preset frequency window.

Example 54 is the system of examples 49-53, wherein the operations further include selecting an additional frequency from one or more additional peak frequencies of the one of the plurality of audio segments or another of the plurality of audio segments, wherein the selected additional frequency corresponds to an additional reference note; determining an additional tuning offset by calculating a difference in frequency between the selected additional frequency and an additional reference frequency of the additional reference note; and updating the tuning offset using the additional tuning offset.

Example 55 is the system of examples 49-54, wherein applying the tuning offset includes adjusting one or more benchmark frequency values, and wherein the operations further include: using the one or more adjusted benchmark frequency values to estimate one or more semitones present in the audio data; and determining a musical property of the audio data using the one or more estimated semitones.

Example 56 is the system of example 55, wherein the musical property is a chord transcription of the audio data corresponding to one or more chords present across a duration of the audio data, wherein determining the musical property includes determining a set of chord candidates having one or more notes matching the one or more estimated semitones.

Example 57 is the system of examples 55 or 56, wherein determining the musical property includes determining a confidence score using the one or more semitones and wherein the confidence score is influenced by a difference between the one or more semitones and one or more expected values.

Example 58 is the system of examples 49-57, wherein applying the tuning offset including adjusting one or more benchmark frequency values or adjusting one or more frequencies of the plurality of audio segments.

Example 59 is a computer-program product tangibly embodied in a non-transitory machine-readable storage medium, including instructions configured to cause a data processing apparatus to perform operations including: receiving incoming audio data; splitting the audio data into a plurality of audio segments; processing the plurality of audio segments by a frequency analyzer to identify one or more peak frequencies in one of the plurality of audio segments; selecting a target frequency of an audio segment by a target frequency selector from the one or more peak frequencies, wherein the target frequency corresponds to a reference note having a reference frequency; processing the audio segment to determine a tuning offset including calculating a difference in frequency between the target frequency and the reference frequency; and applying the tuning offset using a frequency adjustor when the audio data includes untuned audio data.

Example 60 is the computer-program product of example 59, wherein selecting the target frequency includes determining correlation scores between each of the one or more peak frequencies and each of one or more reference notes, wherein determining a correlation score includes determining a likelihood that a peak frequency corresponds to a reference note; and choosing the target frequency form the one or more peak frequencies as having the highest of the correlation scores.

Example 61 is the computer-program product of example 59, wherein selecting the target frequency includes choosing a target frequency from the one or more peak frequencies; determining correlation scores between the target frequency and each of a plurality of reference notes, wherein determining a correlation score includes determining a likelihood that the target frequency corresponds to a reference note; and selecting the reference note from the plurality of references notes as having the highest of the correlation scores.

Example 62 is the computer-program product of examples 59-61, wherein selecting the target frequency further includes identifying that the target frequency falls within a preset frequency window, and wherein applying the tuning offset includes adjusting one or more benchmark frequency values when the one or more benchmark frequency values falls within the preset frequency window.

Example 63 is the computer-program product of examples 59-63, wherein the operations further include determining an additional tuning offset for an additional target frequency that falls within an additional preset frequency window, wherein the additional preset frequency window corresponds to notes that do not fall within the preset frequency window, and wherein applying the tuning offset includes adjusting an additional one or more benchmark frequency values when the additional one or more benchmark frequency values falls within the additional preset frequency window.

Example 64 is the computer-program product of examples 59-63, wherein the operations further include selecting an additional frequency from one or more additional peak frequencies of the one of the plurality of audio segments or another of the plurality of audio segments, wherein the selected additional frequency corresponds to an additional reference note; determining an additional tuning offset by calculating a difference in frequency between the selected additional frequency and an additional reference frequency of the additional reference note; and updating the tuning offset using the additional tuning offset.

Example 65 is the computer-program product of examples 59-64, wherein applying the tuning offset includes adjusting one or more benchmark frequency values, and wherein the operations further include: using the one or more adjusted benchmark frequency values to estimate one or more semitones present in the audio data; and determining a musical property of the audio data using the one or more estimated semitones.

Example 66 is the computer-program product of example 65, wherein the musical property is a chord transcription of the audio data corresponding to one or more chords present across a duration of the audio data, wherein determining the musical property includes determining a set of chord candidates having one or more notes matching the one or more estimated semitones.

Example 67 is the computer-program product of examples 65 or 66, wherein determining the musical property includes determining a confidence score using the one or more semitones and wherein the confidence score is influenced by a difference between the one or more semitones and one or more expected values.

Example 68 is the computer-program product of examples 59-67, wherein applying the tuning offset including adjusting one or more benchmark frequency values or adjusting one or more frequencies of the plurality of audio segments.

Example 69 is a computer-implemented method comprising receiving incoming audio data; splitting the audio data into a plurality of audio segments; processing the plurality of audio segments by a frequency analyzer to identify one or more peak frequencies in one of the plurality of audio segments; selecting a target frequency of an audio segment by a target frequency selector from the one or more peak frequencies, wherein the target frequency corresponds to a reference note having a reference frequency; processing the audio segment to determine a tuning offset including calculating a difference in frequency between the target frequency and the reference frequency; and applying the tuning offset using a frequency adjustor when the audio data includes untuned audio data.

Example 70 is the method of example 69, wherein selecting the target frequency includes determining correlation scores between each of the one or more peak frequencies and each of one or more reference notes, wherein determining a correlation score includes determining a likelihood that a peak frequency corresponds to a reference note; and choosing the target frequency form the one or more peak frequencies as having the highest of the correlation scores.

Example 71 is the method of example 69, wherein selecting the target frequency includes choosing a target frequency from the one or more peak frequencies; determining correlation scores between the target frequency and each of a plurality of reference notes, wherein determining a correlation score includes determining a likelihood that the target frequency corresponds to a reference note; and selecting the reference note from the plurality of references notes as having the highest of the correlation scores.

Example 72 is the method of examples 69-71, wherein selecting the target frequency further includes identifying that the target frequency falls within a preset frequency window, and wherein applying the tuning offset includes adjusting one or more benchmark frequency values when the one or more benchmark frequency values falls within the preset frequency window.

Example 73 is the method of example 72, further comprising determining an additional tuning offset for an additional target frequency that falls within an additional preset frequency window, wherein the additional preset frequency window corresponds to notes that do not fall within the preset frequency window, and wherein applying the tuning offset includes adjusting an additional one or more benchmark frequency values when the additional one or more benchmark frequency values falls within the additional preset frequency window.

Example 74 is the method of examples 69-73, further comprising: selecting an additional frequency from one or more additional peak frequencies of the one of the plurality of audio segments or another of the plurality of audio segments, wherein the selected additional frequency corresponds to an additional reference note; determining an additional tuning offset by calculating a difference in frequency between the selected additional frequency and an additional reference frequency of the additional reference note; and updating the tuning offset using the additional tuning offset.

Example 75 is the method of examples 69-74, wherein applying the tuning offset includes adjusting one or more benchmark frequency values, and wherein the method further comprises: using the one or more adjusted benchmark frequency values to estimate one or more semitones present in the audio data; and determining a musical property of the audio data using the one or more estimated semitones.

Example 76 is the method of example 75, wherein the musical property is a chord transcription of the audio data corresponding to one or more chords present across a duration of the audio data, wherein determining the musical property includes determining a set of chord candidates having one or more notes matching the one or more estimated semitones.

Example 77 is the method of examples 75 or 76, wherein determining the musical property includes determining a confidence score using the one or more semitones and wherein the confidence score is influenced by a difference between the one or more semitones and one or more expected values.

Example 78 is the method of examples 69-77, wherein applying the tuning offset including adjusting one or more benchmark frequency values or adjusting one or more frequencies of the plurality of audio segments.

What is claimed is:

1. A system, comprising:
   one or more data processors; and
   a non-transitory computer-readable storage medium containing instructions which, when executed on the one or more data processors, cause the one or more data processors to perform operations including:
   receiving incoming audio data;
   detecting one or more transients in the audio data;
   splitting the audio data into a plurality of audio segments, wherein splitting the audio data includes using the one or more transients;
   processing the plurality of audio segments by a frequency analyzer to identify one or more peak frequencies in one of the plurality of audio segments;
   selecting a target frequency of an audio segment by a target frequency selector from the one or more peak frequencies, wherein the target frequency corresponds to a reference note having a reference frequency;
   processing the audio segment to determine a tuning offset including calculating a difference in frequency between the target frequency and the reference frequency; and
   applying the tuning offset using a frequency adjustor when the audio data includes untuned audio data, wherein applying the tuning offset includes applying the tuning offset to the plurality of audio segments.

2. The system of claim 1, wherein selecting the target frequency includes:
   determining correlation scores between each of the one or more peak frequencies and each of one or more reference notes, wherein determining a correlation score includes determining a likelihood that a peak frequency corresponds to a reference note; and
   choosing the target frequency form the one or more peak frequencies as having the highest of the correlation scores.

3. The system of claim 1, wherein selecting the target frequency includes:
choosing a target frequency from the one or more peak frequencies;
determining correlation scores between the target frequency and each of a plurality of reference notes, wherein determining a correlation score includes determining a likelihood that the target frequency corresponds to a reference note; and
selecting the reference note from the plurality of references notes as having the highest of the correlation scores.

4. The system of claim 1, wherein selecting the target frequency further includes identifying that the target frequency falls within a preset frequency window, and wherein applying the tuning offset includes adjusting one or more benchmark frequency values when the one or more benchmark frequency values falls within the preset frequency window.

5. The system of claim 4, wherein the operations further include:
determining an additional tuning offset for an additional target frequency that falls within an additional preset frequency window, wherein the additional preset frequency window corresponds to notes that do not fall within the preset frequency window, and wherein applying the tuning offset includes adjusting an additional one or more benchmark frequency values when the additional one or more benchmark frequency values falls within the additional preset frequency window.

6. The system of claim 1, wherein the operations further include:
selecting an additional frequency from one or more additional peak frequencies of the one of the plurality of audio segments or another of the plurality of audio segments, wherein the selected additional frequency corresponds to an additional reference note;
determining an additional tuning offset by calculating a difference in frequency between the selected additional frequency and an additional reference frequency of the additional reference note; and
updating the tuning offset using the additional tuning offset.

7. The system of claim 1, wherein applying the tuning offset includes adjusting one or more benchmark frequency values, and wherein the operations further include:
using the one or more adjusted benchmark frequency values to estimate one or more semitones present in the audio data; and
determining a musical property of the audio data using the one or more estimated semitones.

8. The system of claim 7, wherein the musical property is a chord transcription of the audio data corresponding to one or more chords present across a duration of the audio data, wherein determining the musical property includes determining a set of chord candidates having one or more notes matching the one or more estimated semitones.

9. The system of claim 7, wherein determining the musical property includes determining a confidence score using the one or more semitones and wherein the confidence score is influenced by a difference between the one or more semitones and one or more expected values.

10. The system of claim 1, wherein applying the tuning offset including adjusting one or more benchmark frequency values or adjusting one or more frequencies of the plurality of audio segments.

11. A computer-program product tangibly embodied in a non-transitory machine-readable storage medium, including instructions configured to cause a data processing apparatus to perform operations including:
receiving incoming audio data;
detecting one or more transients in the audio data;
splitting the audio data into a plurality of audio segments, wherein splitting the audio data includes using the one or more transients;
processing the plurality of audio segments by a frequency analyzer to identify one or more peak frequencies in one of the plurality of audio segments;
selecting a target frequency of an audio segment by a target frequency selector from the one or more peak frequencies, wherein the target frequency corresponds to a reference note having a reference frequency;
processing the audio segment to determine a tuning offset including calculating a difference in frequency between the target frequency and the reference frequency; and
applying the tuning offset using a frequency adjustor when the audio data includes untuned audio data, wherein applying the tuning offset includes applying the tuning offset to the plurality of audio segments.

12. The computer-program product of claim 11, wherein selecting the target frequency includes:
determining correlation scores between each of the one or more peak frequencies and each of one or more reference notes, wherein determining a correlation score includes determining a likelihood that a peak frequency corresponds to a reference note; and
choosing the target frequency form the one or more peak frequencies as having the highest of the correlation scores.

13. The computer-program product of claim 11, wherein selecting the target frequency includes:
choosing a target frequency from the one or more peak frequencies;
determining correlation scores between the target frequency and each of a plurality of reference notes, wherein determining a correlation score includes determining a likelihood that the target frequency corresponds to a reference note; and
selecting the reference note from the plurality of references notes as having the highest of the correlation scores.

14. The computer-program product of claim 11, wherein selecting the target frequency further includes identifying that the target frequency falls within a preset frequency window, and wherein applying the tuning offset includes adjusting one or more benchmark frequency values when the one or more benchmark frequency values falls within the preset frequency window.

15. The computer-program product of claim 14, wherein the operations further include:
determining an additional tuning offset for an additional target frequency that falls within an additional preset frequency window, wherein the additional preset frequency window corresponds to notes that do not fall within the preset frequency window, and wherein applying the tuning offset includes adjusting an additional one or more benchmark frequency values when the additional one or more benchmark frequency values falls within the additional preset frequency window.

16. The computer-program product of claim 11, wherein the operations further include:
selecting an additional frequency from one or more additional peak frequencies of the one of the plurality of audio segments or another of the plurality of audio segments, wherein the selected additional frequency corresponds to an additional reference note;

determining an additional tuning offset by calculating a difference in frequency between the selected additional frequency and an additional reference frequency of the additional reference note; and updating the tuning offset using the additional tuning offset.

17. The computer-program product of claim 11, wherein applying the tuning offset includes adjusting one or more benchmark frequency values, and wherein the operations further include:

using the one or more adjusted benchmark frequency values to estimate one or more semitones present in the audio data; and determining a musical property of the audio data using the one or more estimated semitones.

18. The computer-program product of claim 17, wherein the musical property is a chord transcription of the audio data corresponding to one or more chords present across a duration of the audio data, wherein determining the musical property includes determining a set of chord candidates having one or more notes matching the one or more estimated semitones.

19. The computer-program product of claim 17, wherein determining the musical property includes determining a confidence score using the one or more semitones and wherein the confidence score is influenced by a difference between the one or more semitones and one or more expected values.

20. The computer-program product of claim 11, wherein applying the tuning offset including adjusting one or more benchmark frequency values or adjusting one or more frequencies of the plurality of audio segments.

21. A computer-implemented method, comprising:
receiving incoming audio data;
detecting one or more transients in the audio data;
splitting the audio data into a plurality of audio segments, wherein splitting the audio data includes using the one or more transients;
processing the plurality of audio segments by a frequency analyzer to identify one or more peak frequencies in one of the plurality of audio segments;
selecting a target frequency of an audio segment by a target frequency selector from the one or more peak frequencies, wherein the target frequency corresponds to a reference note having a reference frequency;
processing the audio segment to determine a tuning offset including calculating a difference in frequency between the target frequency and the reference frequency; and
applying the tuning offset using a frequency adjustor when the audio data includes untuned audio data, wherein applying the tuning offset includes applying the tuning offset to the plurality of audio segments.

22. The method of claim 21, wherein selecting the target frequency includes:
determining correlation scores between each of the one or more peak frequencies and each of one or more reference notes, wherein determining a correlation score includes determining a likelihood that a peak frequency corresponds to a reference note; and
choosing the target frequency form the one or more peak frequencies as having the highest of the correlation scores.

23. The method of claim 21, wherein selecting the target frequency includes:
choosing a target frequency from the one or more peak frequencies;
determining correlation scores between the target frequency and each of a plurality of reference notes, wherein determining a correlation score includes determining a likelihood that the target frequency corresponds to a reference note; and
selecting the reference note from the plurality of references notes as having the highest of the correlation scores.

24. The method of claim 21, wherein selecting the target frequency further includes identifying that the target frequency falls within a preset frequency window, and wherein applying the tuning offset includes adjusting one or more benchmark frequency values when the one or more benchmark frequency values falls within the preset frequency window.

25. The method of claim 24, further comprising determining an additional tuning offset for an additional target frequency that falls within an additional preset frequency window, wherein the additional preset frequency window corresponds to notes that do not fall within the preset frequency window, and wherein applying the tuning offset includes adjusting an additional one or more benchmark frequency values when the additional one or more benchmark frequency values falls within the additional preset frequency window.

26. The method of claim 21, further comprising:
selecting an additional frequency from one or more additional peak frequencies of the one of the plurality of audio segments or another of the plurality of audio segments, wherein the selected additional frequency corresponds to an additional reference note;
determining an additional tuning offset by calculating a difference in frequency between the selected additional frequency and an additional reference frequency of the additional reference note; and
updating the tuning offset using the additional tuning offset.

27. The method of claim 21, wherein applying the tuning offset includes adjusting one or more benchmark frequency values, and wherein the method further comprises:
using the one or more adjusted benchmark frequency values to estimate one or more semitones present in the audio data; and
determining a musical property of the audio data using the one or more estimated semitones.

28. The method of claim 27, wherein the musical property is a chord transcription of the audio data corresponding to one or more chords present across a duration of the audio data, wherein determining the musical property includes determining a set of chord candidates having one or more notes matching the one or more estimated semitones.

29. The method of claim 27, wherein determining the musical property includes determining a confidence score using the one or more semitones and wherein the confidence score is influenced by a difference between the one or more semitones and one or more expected values.

30. The method of claim 21, wherein applying the tuning offset including adjusting one or more benchmark frequency values or adjusting one or more frequencies of the plurality of audio segments.

* * * * *